US010372226B2

(12) United States Patent
Dai et al.

(10) Patent No.: US 10,372,226 B2
(45) Date of Patent: *Aug. 6, 2019

(54) VISUAL LANGUAGE FOR HUMAN COMPUTER INTERFACES

(71) Applicant: FASTVDO LLC, Melbourne, FL (US)

(72) Inventors: Wei Dai, Clarksville, MD (US); Madhu Peringassery Krishnan, Melbourne, FL (US); Pankaj Topiwala, Cocoa Beach, FL (US)

(73) Assignee: FASTVDO LLC, Cocoa Beach, FL (US)

( * ) Notice: Subject to any disclaimer, the term of this patent is extended or adjusted under 35 U.S.C. 154(b) by 173 days.

This patent is subject to a terminal disclaimer.

(21) Appl. No.: 15/346,665

(22) Filed: Nov. 8, 2016

(65) Prior Publication Data

US 2017/0153711 A1 Jun. 1, 2017

Related U.S. Application Data

(63) Continuation of application No. 13/830,787, filed on Mar. 14, 2013, now Pat. No. 9,524,028.

(Continued)

(51) Int. Cl.
*G06F 3/01* (2006.01)
*G06T 7/246* (2017.01)
(Continued)

(52) U.S. Cl.
CPC ............ *G06F 3/017* (2013.01); *G06F 3/0304* (2013.01); *G06T 7/11* (2017.01); *G06T 7/246* (2017.01);
(Continued)

(58) Field of Classification Search
CPC .......... G06F 3/017; G06F 3/0304; G06T 7/11; G06T 7/246; G06T 7/73; G06T 7/90; G06T 2207/30196
See application file for complete search history.

(56) References Cited

U.S. PATENT DOCUMENTS 4,843,568 A * 6/1989 Krueger ................. G06F 3/011
345/632
5,454,043 A 9/1995 Freeman
(Continued)

OTHER PUBLICATIONS

Chen, F.-S., et al., "Hand gesture recognition using a real-time tracking method and hidden Markov models," Image and Vision Company, 2003, pp. 745-758, vol. 31.
(Continued)

*Primary Examiner* — Benyam Ketema
(74) *Attorney, Agent, or Firm* — Fenwick & West LLP

(57) ABSTRACT

Embodiments of the invention recognize human visual gestures, as captured by image and video sensors, to develop a visual language for a variety of human computer interfaces. One embodiment provides a method for recognizing a hand gesture positioned by a user hand. The method includes steps of capturing a digital color image of a user hand against a background, applying a general parametric model to the digital color image of the user hand to generate a specific parametric template of the user hand, receiving a second digital image of the user hand positioned to represent a hand gesture, detecting a hand contour of the hand gesture based at least in part on the specific parametric template of the user hand, and recognizing the hand gesture based at least in part on the detected hand contour. Other embodiments include recognizing hand gestures, facial gestures or body gestures captured in a video.

51 Claims, 26 Drawing Sheets

Related U.S. Application Data

(60) Provisional application No. 61/775,122, filed on Mar. 8, 2013.

(51) Int. Cl.
 *G06T 7/11* (2017.01)
 *G06T 7/90* (2017.01)
 *G06F 3/03* (2006.01)
 *G06T 7/73* (2017.01)

(52) U.S. Cl.
 CPC ............... *G06T 7/73* (2017.01); *G06T 7/90* (2017.01); *G06T 2207/10024* (2013.01); *G06T 2207/30196* (2013.01)

(56) References Cited

U.S. PATENT DOCUMENTS

| | | | |
|---|---|---|---|
| 5,581,276 A | 12/1996 | Cipolla et al. | |
| 5,594,469 A | 1/1997 | Freeman et al. | |
| 5,982,352 A | 11/1999 | Pryor | |
| 6,002,808 A | 12/1999 | Freeman | |
| 6,072,494 A | 6/2000 | Nguyen | |
| 6,075,895 A | 6/2000 | Qiao et al. | |
| 6,128,003 A | 10/2000 | Smith et al. | |
| 6,191,773 B1* | 2/2001 | Maruno | G06F 3/017 345/156 |
| 6,215,890 B1 | 4/2001 | Matsuo et al. | |
| 6,222,465 B1 | 4/2001 | Kumar et al. | |
| 6,256,033 B1 | 7/2001 | Nguyen | |
| 6,256,400 B1* | 7/2001 | Takata | G06K 9/00335 379/52 |
| 6,256,628 B1* | 7/2001 | Dobson | G06F 3/0481 |
| 6,359,612 B1* | 3/2002 | Peter | A61B 6/463 345/156 |
| 6,385,331 B2 | 5/2002 | Harakawa et al. | |
| 6,492,986 B1 | 12/2002 | Metaxas et al. | |
| 6,498,628 B2* | 12/2002 | Iwamura | G08C 23/00 345/157 |
| 6,501,515 B1 | 12/2002 | Iwamura | |
| 7,034,807 B2 | 4/2006 | Maggioni | |
| 7,042,440 B2 | 5/2006 | Pryor et al. | |
| 7,050,606 B2 | 5/2006 | Paul et al. | |
| 7,109,970 B1 | 9/2006 | Miller | |
| 7,129,927 B2 | 10/2006 | Mattsson | |
| 7,170,492 B2 | 1/2007 | Bell | |
| 7,259,747 B2 | 8/2007 | Bell | |
| 7,340,077 B2 | 3/2008 | Gokturk et al. | |
| 7,348,963 B2 | 3/2008 | Bell | |
| 7,428,542 B1 | 9/2008 | Fink et al. | |
| 7,598,942 B2 | 10/2009 | Underkoffler et al. | |
| 7,991,401 B2 | 8/2011 | Linder et al. | |
| 8,107,599 B2 | 1/2012 | Topiwala et al. | |
| 8,179,604 B1 | 5/2012 | Prada Gomez et al. | |
| 9,189,855 B2* | 11/2015 | Guigues | G06T 7/246 |
| 9,275,277 B2* | 3/2016 | Onen | G06F 3/017 |
| 9,317,124 B2* | 4/2016 | Kongqiao | G06K 9/00375 |
| 9,384,556 B2* | 7/2016 | Mazurenko | G06K 9/00355 |
| 9,524,562 B2* | 12/2016 | Liang | G06K 9/6212 |
| 2002/0126876 A1* | 9/2002 | Paul | G06F 3/017 382/104 |
| 2005/0271279 A1* | 12/2005 | Fujimura | G06K 9/00355 382/203 |
| 2006/0187196 A1 | 8/2006 | Underkoffler et al. | |
| 2006/0284837 A1* | 12/2006 | Stenger | G06K 9/00375 345/156 |
| 2008/0005703 A1 | 1/2008 | Radivojevic et al. | |
| 2008/0244465 A1* | 10/2008 | Kongqiao | G06F 3/017 715/863 |
| 2009/0300554 A1 | 12/2009 | Kallinen | |
| 2011/0102570 A1* | 5/2011 | Wilf | G06F 3/017 348/77 |
| 2011/0211754 A1* | 9/2011 | Litvak | G06K 9/00375 382/165 |
| 2011/0301934 A1* | 12/2011 | Tardif | G06F 3/017 704/1 |
| 2012/0050530 A1 | 3/2012 | Raman et al. | |
| 2012/0068920 A1* | 3/2012 | Ahn | G06K 9/00355 345/156 |
| 2012/0070036 A1* | 3/2012 | Lee | G06K 9/00375 382/103 |
| 2012/0133580 A1* | 5/2012 | Kirby | G06F 3/017 345/156 |
| 2013/0300659 A1* | 11/2013 | Kang | G06F 3/017 345/158 |
| 2014/0198031 A1* | 7/2014 | Xiong | G06F 3/017 345/156 |
| 2014/0204013 A1* | 7/2014 | O'Prey | G06F 3/017 345/156 |
| 2014/0347263 A1* | 11/2014 | Dai | G06F 3/017 345/156 |

OTHER PUBLICATIONS

Concolato, C., et al., "Coding of Moving Pictures and Audio," ISO/IEC JTC1/SC29/WG11 N11256, Apr. 2010, 49 Pages.

"Draft of White Paper on MPEG-U," ISO/IEC JTC1/SC29/WG11 N13367, Jan. 2013, Geneva, CH, 5 Pages.

Gorman, C., "Microsoft Kinect Learns to Read Hand Gestures, Minority Report—Style Interface Now Possible," IEEE Spectrum, Mar. 13, 2013, 3 pages, can be retrieved at <URL: http://spectrum.ieee.org/automaton/robotics/robotics-software/microsoft-k- inect-hand-gesture-control/?utm_source=techalert&utm_medium=em- ail&utm_campaign=031413>.

International Search Report and Written Opinion for International Application No. PCT/US14/19406, dated Sep. 9, 2014, 18 pages.

Lim, S.Y., et al., "Study of ISO/IEC DIS 23007-2 Advanced User Interaction Interface" ISO/IEC JTC1/SC29/WG11 N12298, Dec. 2011, 38 Pages.

United States Office Action, U.S. Appl. No. 13/830,787, dated Mar. 7, 2016, 67 pages.

United States Office Action, U.S. Appl. No. 13/830,787, dated Jul. 22, 2015, 58 pages.

\* cited by examiner

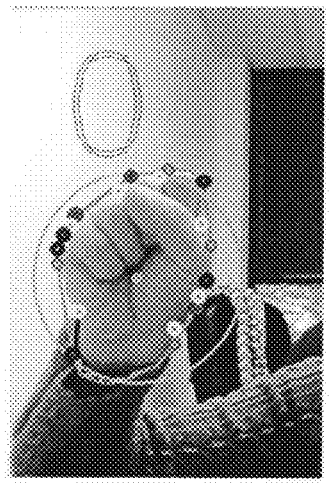 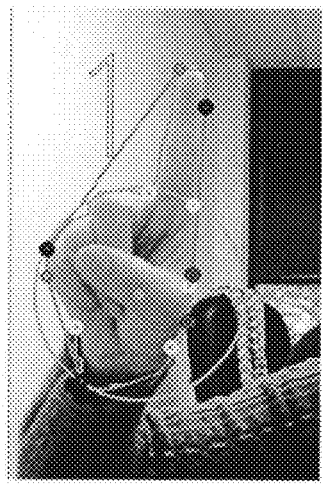 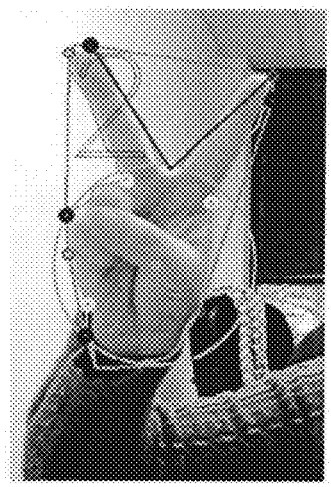
FIG. 15A    FIG. 15B    FIG. 15C
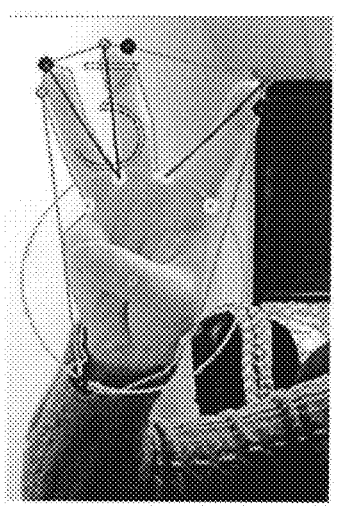 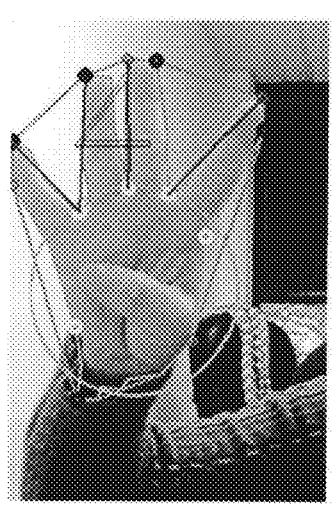 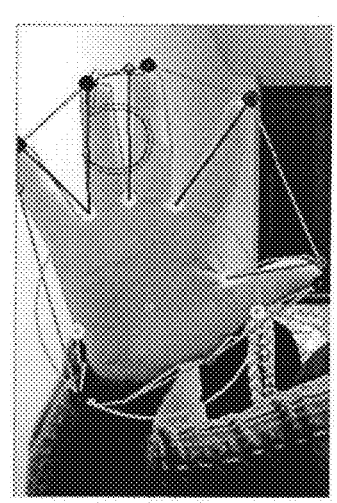
FIG. 15D    FIG. 15E    FIG. 15F

VISUAL LANGUAGE FOR HUMAN COMPUTER INTERFACES

CROSS-REFERENCE TO RELATED APPLICATIONS

This application is a continuation of co-pending U.S. application Ser. No. 13/830,787 filed Mar. 14, 2013, entitled "Visual Language for Human Computer Interfaces" which claims priority to U.S. Provisional Patent Application No. 61/775,122, filed on Mar. 8, 2013, entitled "Methods, Apparatus, and Computer Program for a Visual Language for Human Computer Interfaces," all of which are incorporated by reference herein in their entirety.

BACKGROUND

This invention relates generally to visual languages for human computer interfaces, and more specifically to recognizing human visual gestures, as captured by image and video sensors, to develop a visual language for human computer interfaces.

Human Computer Interface (HCI) has been a field of research for more than 30 years with a wide range of applications from innovative ways for scrolling through websites or documents to advanced media manipulation. The recent development of mobile platforms, such as smartphones and tablets, has brought significant innovations in a rapidly developing commercial field, inviting innovative human computer interfaces to enhance user convenience. For example, recently developed mobile communications platforms, such as smartphones and tablets, incorporate multiple image/video cameras, and touch screens with multi-touch sensitivity, and generally avoid traditional keyboards, mince and pencil-like entry devices. Recent gaming devices have added further innovation of incorporating human visual gestures into the gaming system, e.g., multiple sensors including depth sensors, for a computer to understand human body gestures.

One emerging approach to human computer interface is hand gesture recognition, which is the problem of recognizing pre-defined shapes and figures, and any associated motions, formed with a human hand. It is a subfield of gesture recognition, which is the problem of recognizing pre-defined gestures with the human body. A related, but a more challenging example, is recognizing gestures of the human face, or of the human body. Gesture recognition is currently a rapidly developing area of pattern recognition, due to emerging applications in many areas, such as consumer electronics and mobile communications. Gesture recognition is starting to be used in a variety of commercial applications, from video games to controlling consumer electronics products.

There are multiple challenges of existing solutions to human computer interface problems and applications: limited platform size, physical facilities such as keyboards and screen size, limited computing power, and potentially limited bandwidth wireless network connectivity. These challenges stress simplicity and convenience of application design, and put a premium on efficient interfaces. For example, one existing solution recognizes human body motion without any markings, but using multiple sensors including a specialized depth sensor, which makes the human computer interface solution cumbersome and computationally complicated.

SUMMARY

Embodiments of the invention recognize human visual gestures, as captured by ordinary image and video sensors, to develop a visual language for a variety of useful human computer interfaces. The solutions provided by the embodiments of the invention focus on facilitating expression represented by human visual gestures and execution of commands suitable for modern computer applications. A variety of applications is possible, from scrolling through websites or documents, to making selections in menus, to innovative media manipulation, such as media capture, composition, editing, and visualization.

One embodiment of the invention provides a computer-implement method for recognizing a hand gesture positioned by a user hand. The method includes steps of capturing a digital color image of a user hand against a background, where the digital image is captured by a digital image capturing device, e.g., a digital camera contained in a mobile phone. The method further includes steps of applying a general parametric model to the digital color image of the user hand to generate a specific parametric template of the user hand, receiving a second digital image of the user hand, wherein the user hand in the second digital image is positioned to represent a hand gesture, detecting a hand contour of the hand gesture based at least in part on the specific parametric template of the user hand, and recognizing the hand gesture based at least in part on the detected hand contour.

Another embodiment of the invention provides a computer-implemented method for recognizing hand gestures positioned by a user hand captured in a video. The method includes steps of receiving an input video of a user hand against a background, where the input video has a plurality of video frames of the user hand captured using a digital image capturing device, and a video frame of the plurality video frames represents a digital color image of the user hand at a time instance. The method further includes steps of selecting a video frame of the plurality of the video frames of the input video as a reference frame, applying a general parametric model to the selected video frame of the user hand to generate a specific parameter template of the user hand, and subsequently receiving one or more video frames of input video of the user hand, where the user hand in a subsequently received video frame is positioned to represent a hand gesture. For each subsequently received video frame, the method detects a hand contour of the hand gesture based at least in part on the specific parametric template of the user hand and a motion vector associated with the received video frame, and recognizes the hand gesture based at least in part on the detected hand contours and motion vectors associated with the subsequently received video frames.

Another embodiment of the invention provides a computer-implemented method for recognizing facial gestures captured in a video. The method includes steps of capturing a digital color image of a user face against a background, where the digital image is captured using a digital image capturing device, and applying a general parametric model to the digital color image of the user face to generate a specific parametric template of the user face. The method further includes steps of continuously receiving additional digital images of the user face, where the user face in the additional digital images is configured to represent a facial gesture, with or without motion, detecting a series of facial features and associated motion vectors of the facial gesture utilizing the specific parametric template of the user face, and recognizing the facial gesture based at least in part on the detected facial gestures and associated motion vectors.

Another embodiment of the invention provides a computer-implemented method for recognizing body gestures captured in a video. The method includes steps of capturing a digital color image of a user body against a background, where the digital image is captured using a digital image capturing device gestures captured in a video, and applying a general parametric model to the digital color image of the user body to generate a specific parametric template of the user body. The method further includes steps of continuously receiving additional digital images of the user body, where the user body in the additional digital images is configured to represent a body gesture, with or without motion, detecting a series of body features and associated motion vectors of the body gesture utilizing the specific parametric template of the user body, and recognizing the body gesture based at least in part on the detected body gestures and associated motion vectors.

Another embodiment of the invention develops simple visual codes to express commands to capture, reference, edit, or transmit multimedia messages, which are specifically useful in real-time multimedia applications in a mobile communications environment. A visual code comprises multiple recognized human visual gestures, which are encoded based on a user command. The visual codes can be used for a variety of applications, such as in video editing, including capturing, splicing, blending and other manipulation of videos.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIGS. 15A through 15F illustrate six examples of finger count gestures positioned by a user hand in accordance with an embodiment of the invention.

Figure 1:
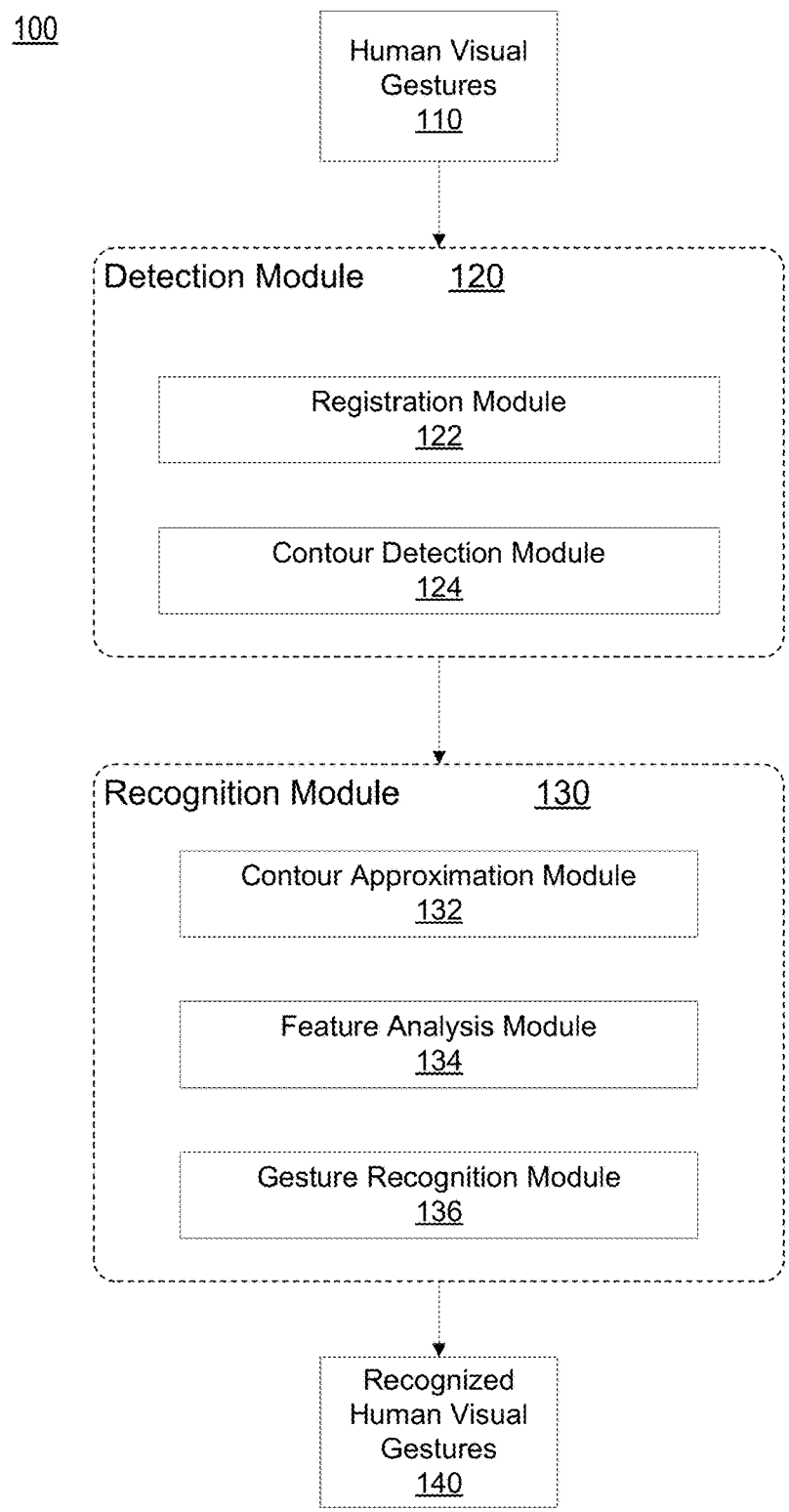
FIG. 1 is a diagram of a computer system for recognizing features positioned by human body in accordance with an embodiment of the invention.

The figures depict various embodiments of the invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure (FIG.) 1 illustrates a computer system 100 for recognizing human visual gestures. The computer system 100 includes a detection module 120 to receive human visual gestures 110 and a recognition module 130 to recognize human visual gestures based on the detection result from the detection module 120. The human visual gestures 110 include static digital images of a variety of human visual gestures, such as hand gesture positioned by a user hand, a body gesture positioned by a human body, and a facial gesture represented by a user face. Other embodiments of the human visual gestures 110 may include an input video of human visual gestures, e.g., hand gestures, body gestures and facial gestures of a human user. The input video includes one or more video frames of human visual gestures and the system 100 processes the video frames of the input video to recognize human visual gestures contained in the video frames.

In one embodiment, the detection module 120 includes a registration module 122 and contour detection module 124. The registration module 122 is configured to receive the human visual gestures 110, e.g., a hand gesture represented by a user hand, and to register the human body part (e.g., user hand) that represents the human visual gesture. Taking a hand gesture as an example, the registration module 122 registers the user hand by applying a general parametric model to the user hand and generates a specific parametric template of the user hand using selected pixels of a digital image that represents the user hand. The contour detection module 124 is configured to detect contour of the human body part that represents the human visual gesture for further processing by the recognition module 130.

In one embodiment, the recognition module 130 includes a contour approximation module 132, a feature analysis module 134 and a gesture recognition module 136. The contour approximation module 132 is configured to approximate the detected human body contour by one or more polygonal segments and to find a convex hull of the approximated polygonal human body contour. The feature analysis module 132 is configured to extract one or more features of the detected human body contour based on the analysis of convexity of the approximated polygonal human body contour. The recognition module 136 is configured to recognize the human visual gestures based on comparison of a refined polygonal approximation of the detected human body contour with a set of known human body gestures, such as the American Sign Language set of hand gestures.

To simplify illustration of various embodiments of the invention, the description from herein uses hand gesture recognition as an example for purposes of illustration only. One skilled in the art will readily recognize from the following discussion that alternative embodiments of the structures and methods illustrated herein may be employed without departing from the principles of the invention described herein. Further, one skilled in the art will readily recognize from the following discussion other types of human visual gesture recognition can be implemented without departing from the principles of the invention described herein. For example, the detection module 120 and gesture recognition module 130 of FIG. 1 is readily applicable to recognize human body gestures and facial gestures similarly as to the hand gesture recognition described below.

Hand Gesture Recognition—Overview

Hand gesture recognition is the problem of recognizing pre-defined shapes and figures, and any associated motions, formed with a human hand. Hand gestures recognition can potentially apply to a vast array of applications, as hands are a natural and potentially powerful input device. Hand gestures in simple forms are shapes that can be described in terms of stick-and-joint-figure representations. One can conceive of proximity of a presented hand to such stick figures as a possible methodology for hand gesture recognition. However, this only serves as crude motivation without considering contours and key points of a hand gesture.

The limitations of existing hand gesture recognition solutions are mitigated by the embodiments of the invention, which build a real-time (and run-time) model of user hand skin tone to recognize hand gesture positioned by a user hand captured in a digital image. In addition, in the presence of video sensors, motion-based features of hand gestures captured in a series of video frames of a video of the user hand also become available for both the creation and recognition of hand gestures captured in the video.

Hand gesture recognition can be conceptually divided into two tasks, hand detection and gesture recognition. Using the computer system 100 depicted in FIG. 1 as an example, the detection module 120 detects a user hand captured in a digital image or in a sequence of video frames of a video of the user hand. The gesture recognition module 130 recognizes hand gestures positioned by the user hand. Hand detection aims to detect a human hand in a captured digital image and segment it from other background image pixels of the captured digital image of the user hand. Once the hand is segmented, the segmented hand data is extracted and forwarded for gesture recognition, which aims to detect and classify a hand gesture from a limited and pre-defined vocabulary of gestures.

Figure 2A:
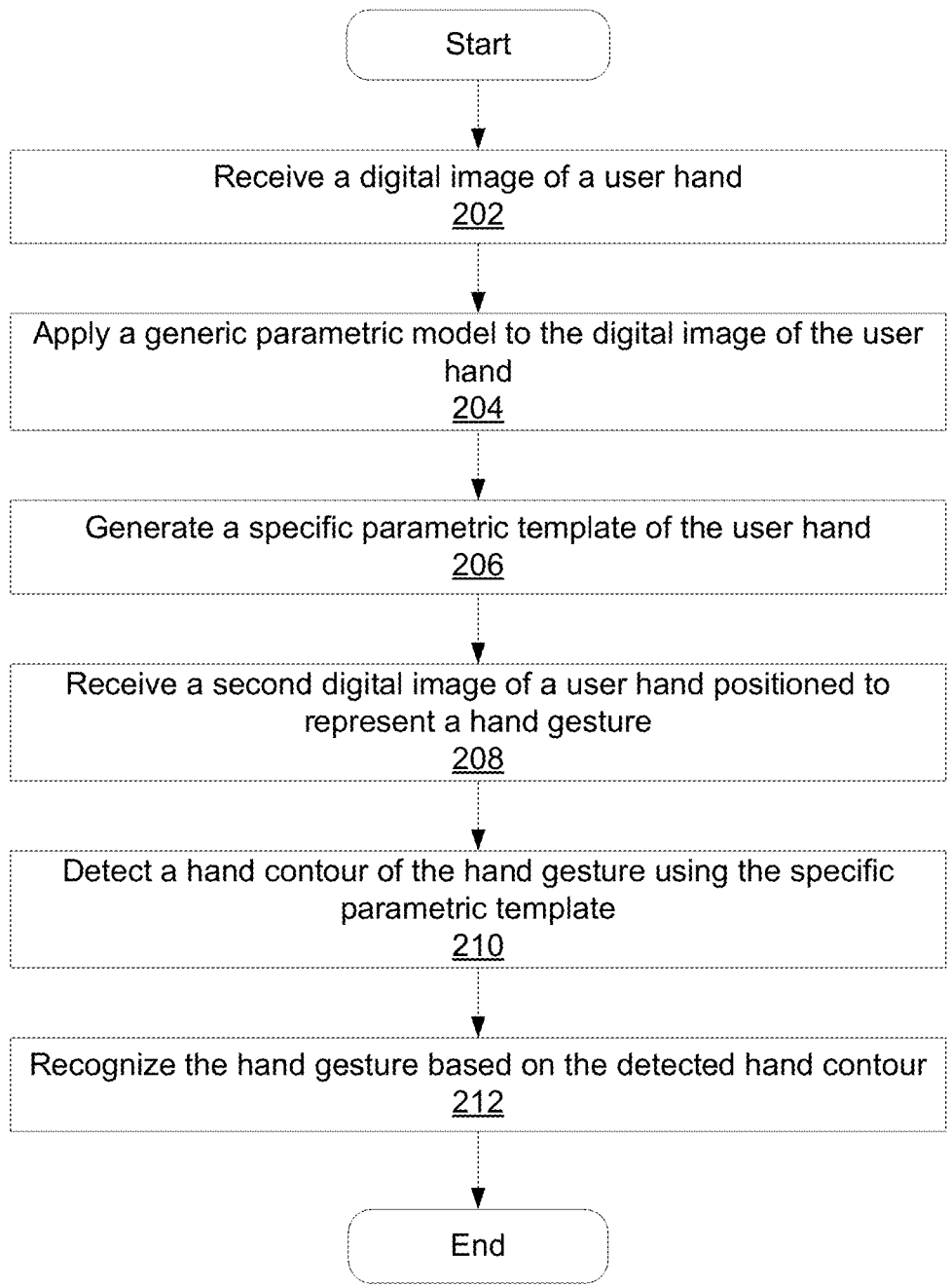
FIG. 2A is a flow chart of a process for recognizing a hand gesture of a user hand captured by a digital capture device in accordance with an embodiment of the invention.

FIG. 2A is a flow chart of a process for recognizing a hand gesture of a user hand captured in a digital image by a digital capture device in accordance with an embodiment of the invention. The computer system 100 depicted in FIG. 1 is configured to receive 202 a digital image of a user hand and applies 204 a generic parametric model to the digital image of the user hand and generates 206 a specific parametric template of the user hand. The computer system 100 is further configured to receive 208 a second digital image of the user hand positioned to represent a hand gesture. The computer system 100 detects 210 a hand contour of the hand gesture using the specific parametric template of the user hand. Based on the detected hand contour, the computer system 100 is further configured to recognize 212 the hand gesture positioned by the user hand in the second digital image.

The computer system 100 is further configured to recognize hand gestures captured in a continuous stream of image frames, e.g., video frames of a video of a user hand positioned in one or more hand gestures. The availability of a continuous stream of image frames offers the computer system 100 opportunity to develop additional features, for both the definition and detection of hand gestures. Thus, hand gestures recognized by the computer system 100 can have a static element (as in a static digital image), a motion element (as in video frames of a video), or a mixture of the two.

Figure 2B:
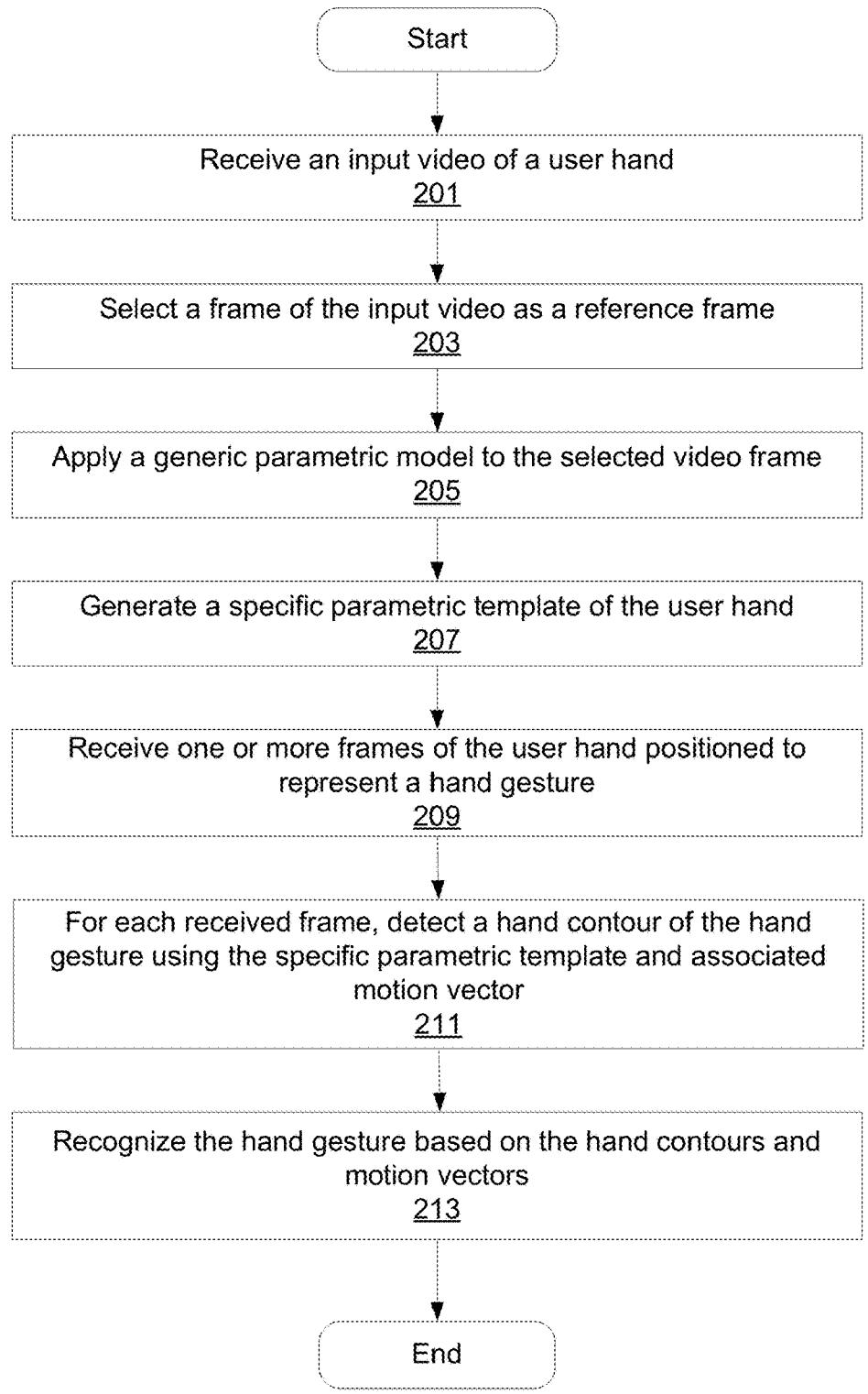
FIG. 2B is a flow chart of a process for recognizing hand gestures positioned by a user hand captured in a video in accordance with an embodiment of the invention.

FIG. 2B is a flow chart of a process for recognizing hand gestures positioned by a user hand captured in a video in accordance with an embodiment of the invention. The computer system 100 depicted in FIG. 1 is configured to receive 201 an input video of user hand, which includes multiple video frames. The computer system 100 is configured to select 203 a video frame of the input video as a reference frame and apply 205 a generic parametric model to the selected video frame. The computer system 100 is configured to generate 207 a specific parametric template of the user hand contained in the reference frame. The computer system 100 is further configured to receive 209 one or more video frames of the input video. For each of the received video frame, computer system 100 is further configured to detect 211 a hand contour of the user hand positioned to represent a hand gesture in the video frame using the specific parametric template of the user hand and motion vector associated with the video frame. Based on the detected hand contours and motion vectors of the video frames, the computer system 100 is further configured to recognize 213 the hand gestures positioned by the user hand in the video frames of the video.

To use the motion vectors of the video frames of the user hand, the computer system 100 is configured to track the motion of objects (e.g., user hand) in the video, whose motion vectors for the blocks occupied by the objects become available as additional features in the analysis and recognition of hand gestures. The motion estimation described above is general, and can be used to analyze the motion not only for hand gestures, but also for facial or body movements and gestures, as well as in many other settings. In particular, the motion estimation scheme enables new motion-based features in video based sensing and pattern recognition. The features can be based on time history of motion vectors generated, as well as the evolution of the spatial regions and their features extracted from individual frames.

In one embodiment, the computer system 100 is configured to employ any existing motion estimation schemes to derive motion vectors, which are known to those of ordinary skills in the art. For example, the computer system 100 is configured to derive motion vectors of video frames of a video by tracking the motion of objects/regions on a block-by-block basis within successive video frames, and generating motion vectors for each block using inter- and intra-frame predictions among the video frames. A further description of embodiments of the motion estimation and motion vectors is provided in U.S. Patent Publication No. 2006/0245497, in U.S. Patent Publication No. 2007/0127577, and in U.S. Patent Publication No. 2010/0290529, which are incorporated by reference in their entirety herein.

Hand Detection—User Hand Pre-Registration

Hand detection in some existing solutions is based on detecting skin tone in color images/video frames of a user hand, employing an a priori generic skin tone model learned from a database of human hands. However, the accuracy of such systems is limited, and unusable for practical applications such as real-time hand gesture recognition. There are existing models of skin color analysis, but most of which are built based on limited human hand skin databases, that may not capture the full variability. Furthermore, as the existing models are targeted for general user applications in arbitrary lighting conditions, they need to account for a wide range of flesh tones, e.g., from very light to dark. Thus, it is inevitable that some background colors will also be detected as part of human skin, posing more challenges to downstream hand gesture recognition procedures, and limiting system accuracy. In order to significantly improve the accuracy of hand skin color/tone analysis, the computer system 100 is configured perform hand pre-registration at run-time prior to hand gesture recognition. This avoids the vagaries of inadequate databases, model variabilities, and environmental conditions.

In one embodiment, a registration module, e.g. the registration module 122 illustrated in FIG. 1, is used to register a user hand's flesh tones in advance. Compared with existing solutions, pre-registering a user hand leads to a much more accurate model of the user's hand, which significantly improves the performance of the entire hand gesture recognition system 100. The system 100 can use the model of the user hand through the entire hand gesture recognition process until the hand gestures are formed by a different user hand.

The registration module 122 receives a digital image of a user hand and applies a general parametric model to the digital image of the user hand for the user hand registration. The registration module 122 selects multiple pixels from the pixels in the digital image that represents the user hand, where the selection of the pixels is defined by the general parametric model. From the selected pixels, the registration module 122 generates a specific parametric template of the user hand.

Figure 3A:
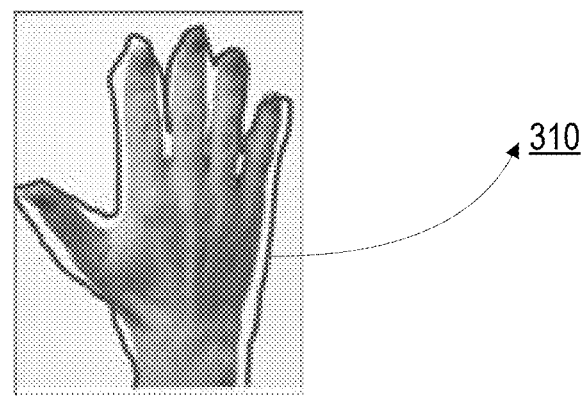
FIG. 3A illustrates applying a general parametric model with a predefined hand outline to register a user hand in accordance with an embodiment of the invention.

The general parametric model can use a predefined hand outline or a predefined region of interest to register the user hand. In one embodiment, the registration module 122 uses a predefined hand outline superimposed in the digital image of the user hand for the registration. FIG. 3A is a general parametric model with a predefined hand outline 310 to register a user hand. A template of a predefined hand outline 310 is presented to user. A user puts his/her hand inside the predefined hand outline. A digital capture device, e.g., a digital camera of a smartphone, captures the user hand. Once the hand image is captured, the template is used as a mask to separate the hand with the background of the hand image. Only pixels of the objects inside the template are used as valid pixels to determine the skin color of the user hand.

Using a template of a predefined hand outline may have some limitations. First, because user hands vary in size, there may not be a good match between the template and a particular user's hand. Some background pixels may also be present, and image processing tools such as histogram selection may be needed to filter out the unwanted pixels. For example, the hand color may cover a wide continuous spectrum, while under controlled conditions, the background pixels can be selected to be very isolated in the color spectrum (e.g., white, black, green, or blue). To reduce the limitation of using the template for user hand registration, a green screen can be used for the background in the template to get an accurate initial capture.

Figure 3B:
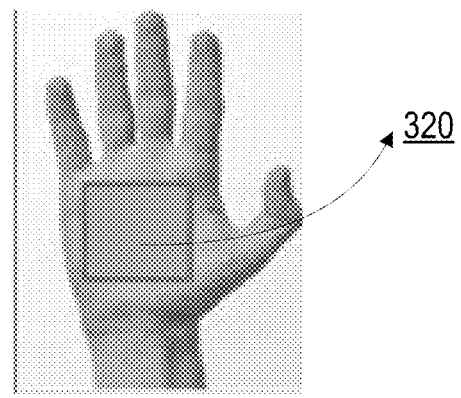
FIG. 3B illustrates applying a general parametric model with a predefined region of interest to register a user hand in accordance with an embodiment of the invention.

In another embodiment, the general parametric model can use a predefined region of interest to register the user hand. FIG. 3B is a general parametric model with a predefined region of interest 320 to register a user hand, in accordance with an embodiment of the invention. A region-of-interest (ROI) window 320 can be presented to a user on a display screen. A user covers the entire ROI window using his/her hand. The registration module 122 uses all pixels inside the ROI window to determine the color parameters of the user hand. By keeping the ROI small, this method can be sensitive to both the user hand as well as environmental conditions, such as lighting. One limitation of this method is that it may not capture the full breadth of tonal variations of the user's hand. Nevertheless, this method is more suitable for real-time hand gesture recognition and is used in the discussions below. Other embodiments may use other methods or consider additional factors, e.g., taking into account of different flesh tones of front (palm) and back of a user hand, for user hand registration.

Hand Detection—Adaptive Hand Detection

Skin detection of a user hand is generally dependent on the illumination of the environment, where the user hand is captured. One set of parameters suitable for a particular scene might not work in other conditions. To reduce the dependency on the illumination of user hand registration, the registration module 122 adds real-time adaptability in choosing the parameters based on actual scenes of user hand registration.

In one embodiment, the registration module 122 applies a color model to the selected pixels of a digital image that presents a user hand and generates a skin map (also called "skin template") of the user hand. From the generated skin map of the user hand, the registration module 122 generates a specific parametric template of the user hand. The specific parametric template is itself adaptable, and decision boundaries are adjusted on the fly at regular time intervals by examining the ROI. The color model can be selected from color models in different color spaces, such as hue-saturation-value (HSV) color space and luma-chroma color space (e.g., YCbCr). Many other color spaces are available, including custom FastVDO integer color spaces of (e.g., FastVDO submissions to International Organization for Standardization (ISO) and International Telecommunication Union (ITU)), based on patented FastVDO technologies, e.g., U.S. Pat. No. RE 40081, which is incorporated by reference in its entirety herein.

In another embodiment, the registration module 122 applies two independent color models to the selected pixels of a digital image that presents a user hand and generates two specific parametric templates. The registration module 122 combines the two specific parametric models to generate an improved parametric template of the user hand. The registration module 122 may also apply two independent color models to the selected pixels of a digital image that presents a user hand and generates two skin maps of the user hand. The registration module 122 combines the two skin maps to generate an improved skin map of the user hand, e.g., by a bit-wise OR operation on the two skin maps.

The registration module 122, in one embodiment, applies two color representations simultaneously to the selected pixels of the digital image that represents the user hand: HSV and YCrCb, in order to detect skin consistently in a wide variety of environmental conditions. Depending on the readings from a region of interest applied to the digital image of the user hand, a dynamic range is assigned for the color components in HSV and YCrCb color space on a frame by frame basis in a scenario of detecting user hand in a video of the user hand.

There are two methods that can be used by the registration module 122 to select the range. In the first method, the registration module 122 calculates one or more first-order statistics of a chosen color space, such as the mean and standard deviation of H, S and V parameters in the ROI of the user hand and the whole video frame of the user hand. The distribution of ROI data are such that H values are cluttered about the mean, while those for S and V show a wider range. For example, the H value range is assigned as [Mean of H(ROI)−Standard Deviation of H(ROI), Mean of (H)ROI+Standard Deviation of H(ROI)]. For S and V parameters, the S or V value range is [Mean of S, V (ROI)−Standard Deviation of S, V(Frame), Mean of S, V (ROI)+Standard Deviation of S, V(Frame)]. The H/S/V values are then employed to detect skin region. The same technique is employed for the same frame in YCrCb color space to get another skin map. A bitwise OR operation is performed to get the final skin map of the user hand.

It is noted that the range of H values in ROI varies depending on the predominant channel in red (R), green (G) and blue (B) parameters in an R-G-B color space. In the second method, the registration module 122 calculates the mean for R, G and B in ROI, and depending on the calculated mean of R, G, B parameters in the ROI, the registration module 122 selects a range for H, S and V values for extracting skin region in HSV color space. For YCrCb color space, the registration module 122 users a fixed range, e.g., Y in (0-255) range, Cr in (131-255) range, Cb in (80-135) range, to determine the skin template in YCrCb color space. A bitwise OR operation is performed to get the final skin m of the user hand.

In the skin detection processing, the registration module 122 further uses threshold on the digital color image that represents a user hand in the ROI window to get the pixels close to the previously registered user hand skin tones values, allowing for changes in lighting and other environment conditions. An adaptive threshold in a chosen color space (from a set of possible color spaces, such as YCbCr, YUV, YIQ, and several custom color spaces), which the chrominance components are emphasized, and the luminosity is deemphasized, may be used to detect the user hand skin pixels and group the detected pixels together.

Hand Detection—Hand Contour Detection

Figure 4:
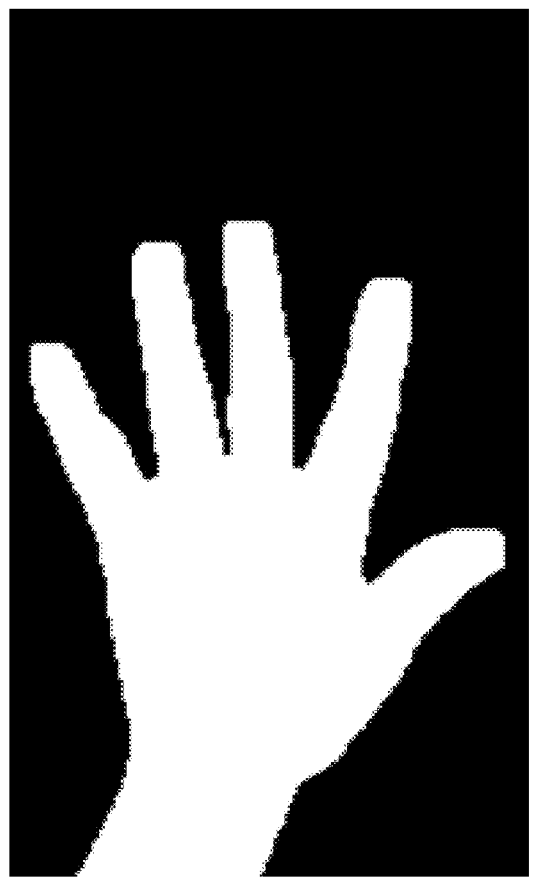
FIG. 4 is an example of a detected hand contour of a registered user hand in accordance with an embodiment of the invention.

A hand contour detection module, e.g., the contour detection module 124 illustrated in FIG. 1, is configured to detect a hand contour of the hand gesture positioned by a user hand. In one embodiment, the hand contour detection module 124 uses one or more morphological operators, e.g., dilation and erosion, to remove noise in the digital image of the hand gesture and regroup isolated elements to form more meaningful regions of the hand gesture. Several contours may be detected within the ROI window, but under the image acquisition conditions recommended, e.g., requesting user hand to be in a specified ROI window, covering about half the display screen, the hand contour detection module 124 is configured to identify the biggest segmented region that represents the hand contour for hand gesture recognition. FIG. 4 is an example of a detected hand contour of a user hand using the schemes described above.

Hand Gesture Recognition—Polygonal Approximation of Detected Hand Contour

The second stage of human visual gesture recognition is gesture recognition. Taking hand gesture recognition as an example, a hand gesture recognition module, e.g. the recognition module 130 illustrated in FIG. 1, is configured to recognize the hand gesture based on the hand contour detected by the detection module 120. In one embodiment, a hand contour approximation module of the recognition module 130 is configured to approximate the detected hand contour by one or more polygonal segments and to find a convex hull of the approximated polygonal hand contour. A feature analysis module of the recognition module 130 is configured to extract one or more features of the detected hand contour based on the convexity analysis of the approximated polygonal hand contour, and a feature recognition module of the recognition module 130 is configured to recognize the hand gesture based on the extracted features.

Figure 5:
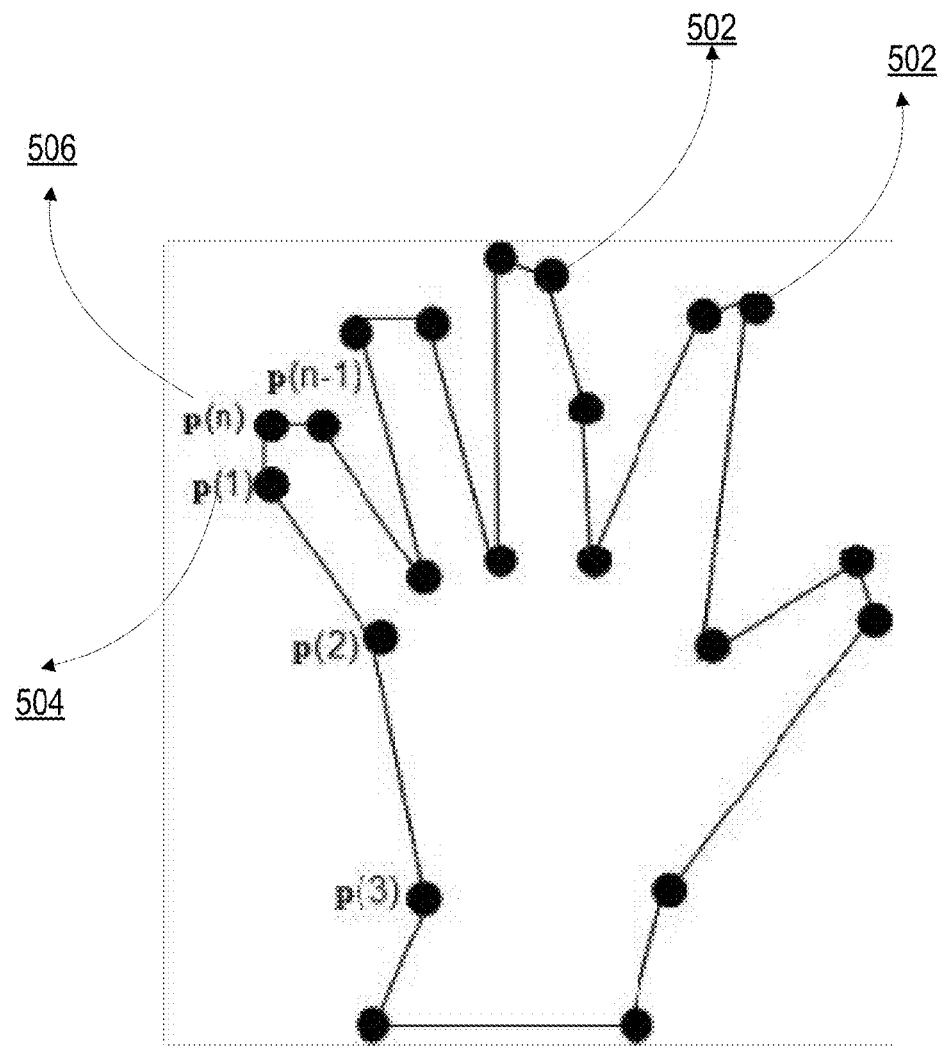
FIG. 5 illustrates a corresponding concave polygon of the hand contour illustrated in FIG. 4.

The hand contour obtained in the previous stage by the detection module 120 is a connected set of pixels of the digital image of a user hand positioned to represent a hand gesture. The boundary of the hand contour can be approximated using a concave polygon as shown in FIG. 5, which illustrates a corresponding concave polygon of the hand contour illustrated in FIG. 4. A polygon vertex is a point where two polygon edges meet, which is denoted as a black dot 502 in FIG. 5. In the description from herein, points in the concave polygon are denoted using bold lowercase letters, sets of points using bold capital letters, scalar values using lowercase letters, and vectors using bold letters as well. For example, in FIG. 5, the set of vertices 502 of the concave polygon can be written as:

$$P=\{p(i):i=1,2,\ldots,n\} \quad (1)$$

where the vertices p(i) are ordered counterclockwise, and where p(1) 504 is the leftmost vertex.

Figure 6:
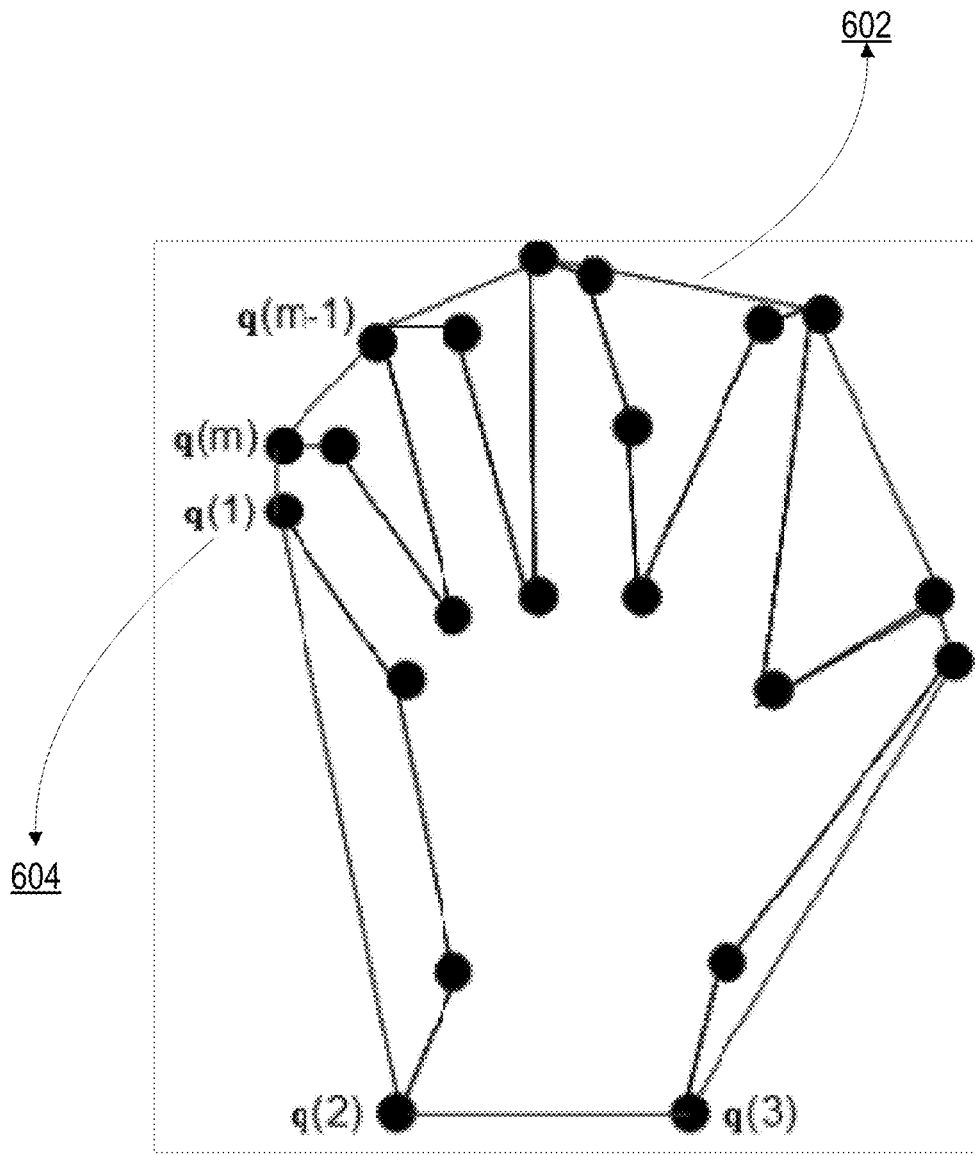
FIG. 6 illustrates a convex envelope polygon of the concave polygon of a hand contour shown in FIG. 5.

A convex envelope polygon (or simply the convex polygon) of a concave polygon is defined as the convex hull of all the vertices of the concave polygon. The convex polygon of the concave polygon in FIG. 5 is the convex polygon 602 shown in FIG. 6, which includes all the vertices of the concave polygon in FIG. 5. The vertex set of the convex envelope polygon 602 can be denoted as:

$$Q=\{q(i):i=1,2,\ldots,m\} \quad (2)$$

where vertices q(i) are ordered counterclockwise, and where q(1) 604 is the leftmost vertex. Given that Q is a subset of P, in Equation (2), m≤n is obtained.

Recall that a concave polygon is a polygon with one or more interior angles greater than 180°. Denote the interior angle of vertex p(i) as IntAngle(i). Since the interior angle cannot be exactly 180° (or the vertex would not be defined), all the vertices p(i) in P can be divided into two subsets $P_1$ and $P_2$, where $$P_1=\{p(i):p(i)\in P \text{ and IntAngle}(i)<180°\} \quad (3)$$

$$P_2=\{p(i):p(i)\in P \text{ and IntAngle}(i)>180°\} \quad (4)$$

$$P_1\cup P_2=P \quad (5)$$

where $Q\subseteq P_1$.

Let e(i) be the edge of the convex envelop polygon between vertices q(i) and q(i+1), d(i, j) as the distance between point p(i) and edge e(i). For every q(i), a corresponding pair of points p(r), p(t)∈P such that p(r)=q(i), and p(t)=q(i+1) can always be found. Now if t≠r+1, then there is at least one point p(s)∈$P_2$ with IntAngle(i)>180°}. Let's denote the set of such interior points as $$S_{i,r,t}=\{p(s),r<s<t, \text{ where } p(s)\in P_2, p(r)=q(i), \text{ and } p(t)=q(i+1)\}. \quad (6)$$

Among these, the point in $S_{i,r,t}$ with maximal distance to edge e(i) is of special interest, and will be used to indicate the distance of pullback from the convex hull. This point will be named as a defect point f(i), where $$f(i)=p(s)\in S_{i,m,n}, \text{ such that } d(i,s)=\max_{r>k>t, \text{ and } p(k)\in S_{i,r,t}}d(k,i) \quad (7)$$

Let F denote the set of all such defect points, also called depth points herein (note that not all edges need have such defect points). Then point sets Q and F will be used as the extracted features of the hand, and are used in the recognition module 130. By definition, the following relationships hold for set P, Q and F:

$$Q\cap F=\emptyset,$$

$$(Q\cup F)\subseteq P.$$

FIGS. 5-8 illustrate the relationship between different set of point P, Q and F. For example, $$q(1)=p(1),$$

$$q(2)=p(4),$$

$$S_{1,1,4}=\{p(2),p(3)\},$$

$$f(1)=p(3),$$

And $$q(m-1)=p(n-3),$$

$$q(m)=p(3),$$

$$S_{m-1,n-3,n}=\{p(n-2),p(n-1)\},$$

$$f(m-1)=p(n-2).$$

Point sets P, Q and F, have special interest to hand gesture feature extraction.

Figure 7:
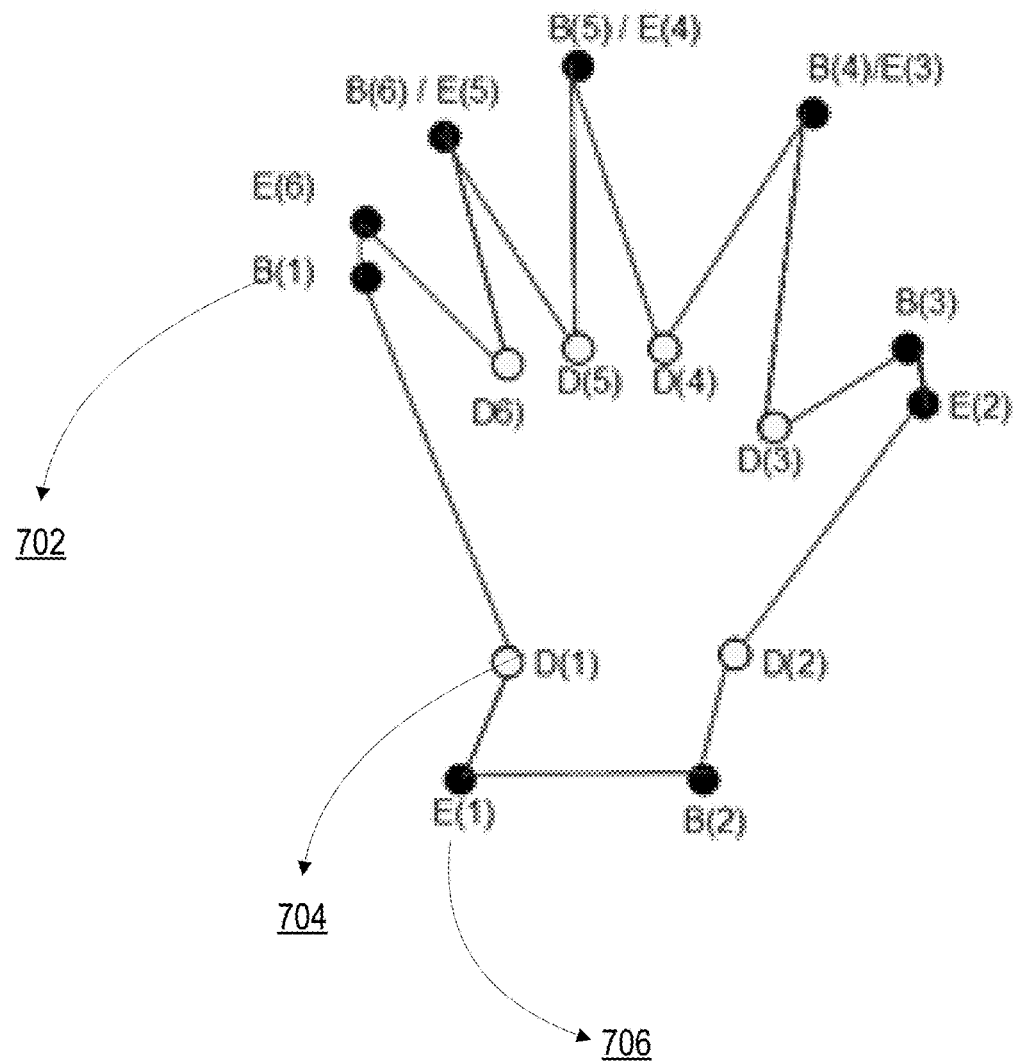
FIG. 7 illustrates an example triplet of planar vectors, "Begin," "Defect" and "End" of a segment of a convex hull that has defect points.

Let's number the defect points f(i) in a counterclockwise manner from 1 to k, with the leftmost defect point as f(i). From the definition of f(i), it is the point with the maximal pullback distance from the edge between vertices q(i) and q(i+1). The triplet of points q(i), f(i), and q(i+1) can be grouped together as a triplet of 2-dimensional vectors in the plane: {B(i), D(i), E(i)}, where B(i)=q(i), D(i)=f(i) and E(i)=q(i+1). FIG. 7 illustrates an example triplet of planar vectors {B(i), D(i), E(i)}, where letter "B" stands for "Begin, letter "D" for "Defect" and letter "E" for "End" of a segment of the convex hull that has such defect points, such as the triplet {B(1), D(1) and E(1)} indicated by 702, 704 and 706.

Let (x,y) be the pixel position of each point. Then the following measurements are made:

The perimeter of concave polygon (hand contour):

$$p=\Sigma_{i=1}^{i=n-1}\|p(i+1)-p(i)\|+\|p(n)-p(1)\| \quad (8)$$

The roundness ratio:

$$Y=\frac{p^2}{4\pi A}, \quad (9)$$

where A is the area of hand region or the number of pixels detected as hand.

The distance between points B(i) and D(i) is defined by Equation (10):

$$a(i)=\sqrt{(B(i).x-D(i).x)^2+(B(i).y-D(i).y)^2} \quad (10)$$

The distance between points E(i) and D(i) is defined by Equation (11):

$$b(i)=\sqrt{(E(i).x-D(i).x)^2+(E(i).y-D(i).y)^2} \quad (11)$$

The distance between points B(i) and C_p (center of Palm) is defined by Equation (12):

$$bc(i)=\sqrt{(B(i).x-C\_P(i).x)^2+(B(i).y-C\_P(i).y)^2} \quad (12)$$

The distance between points E(i) and C_p is defined by Equation (13):

$$ec(i)=\sqrt{(E(i).x-C\_P(i).x)^2+(E(i).y=C\_P(i).y)^2} \quad (13).$$

Figures 8A, 8B:
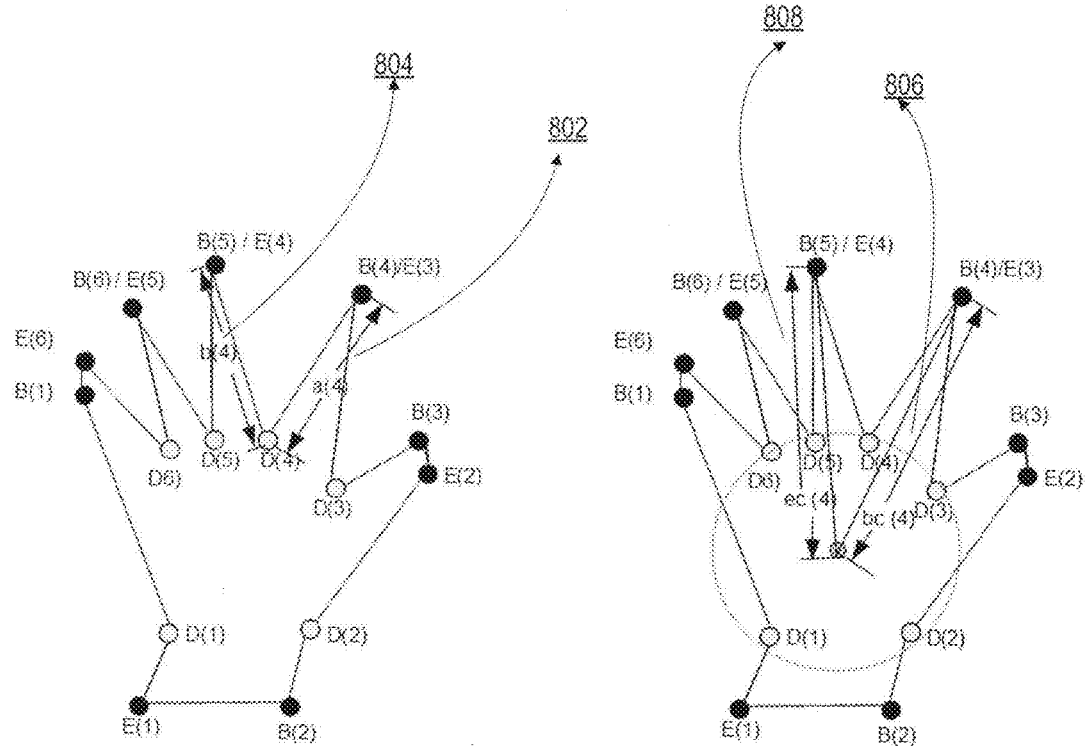
FIGS. 8A and 8B illustrate an example of measurement of the distances among a "Begin" vertex, a "Defect" vertex, an "End" vertex and a center of palm of a segment of a convex hull.

FIGS. 8A and 8B illustrate an example of the measurement of the distances a(4), b(4), bc(4) and ec(4) using Equations (10)-(13) as indicated by 802, 804, 806 and 808.

Furthermore, let $v_b(i)=\overline{D(i)B(i)}$ be a vector from point D(i) to B(i), $v_e(i)=\overline{D(i)E(i)}$ be a vector from point D(i) to E(i), then the dot product between vector $v_b(i)$ $v_e(i)$ can be computed as:

$$v_b(i) \cdot v_e(i) = \frac{(B(t)x - D(t)x)\cdot(E(t)x-D(t)x) - (B(t)y-D(t)y)\cdot(E(t)y-D(t)y)}{a(t)\cdot b(t)}. \quad (14)$$

Hand Gesture Recognition—Feature Extraction

To recognize a hand gesture, the computer system 100 uses various features of the hand gesture extracted from the digital images of the user hand. Specifically, given an image, or a region within an image, the computer system 100 extracts the features that are subsequently fed to a classifier in order to recognize various gestures that may be presented within the image.

There are a variety of ways to generate features needed for human visual feature recognition. Features can be generated via linear transforms of input samples. If the transform is suitably chosen, transform domain features can exhibit high "information packing" properties compared with the original input samples. The basic reasoning behind transform-based features is that an appropriately chosen transform can exploit and remove information redundancies, which usually exist in the set of examples obtained by the measuring devices. Existing transforms used to generate features include the Karhunen-Loeve Transform (KLT), the Singular Value Decomposition, the Discrete Fourier Transform (DFT), the Discrete Cosine and Sine Transforms, the Hadamard Transform, the Haar Transform, the Discrete Wavelet Transform (DWT), the Multiresolution Analysis and Wavelet Packets.

Besides linear transformations, there are a number of alternative feature generation methods, which are application dependent. Based on how the computer system 100 treats the value of samples in the interested region of a digital image of a human visual gesture, there are different ways to extract useful information from the textures of the interested image. The sample values can be treated as random variables. The first-order statistics features, second-order statistics features (e.g., Co-occurrence Matrices) and features based on instant moments can be obtained. Image can also be treated as a successive sequence of rows or columns. In this case, the computer system 100 can model its underlying generation mechanism by adopting an appropriate parametric model. The parameters of the resulting models encode useful information and lend themselves as powerful feature candidates in human visual feature recognition.

Based on features chosen, different classifiers are applied. In one embodiment, the detection module 120 of the computer system 100 applies two different classifiers. In hand detection stage, a general parametric model can be used. This model has finite-dimensional parameters. Each element of the parameter vector is associated with a probability distribution, such as Poisson distribution, normal distribution, Gaussian distribution etc. With distribution function, the classifier can not only output the best choice, but also a probability. Some classifier algorithm can even provide a list of N-best output with probabilities. In gesture detection stage, a nonlinear classifier, such as decision trees, is used. Decision trees are multistage decision systems in which classes are sequentially rejected until the gesture recognition module reaches a finally accepted class of gestures.

Hand Gesture Recognition—Hand Feature Recognition

Given a digital image of a user hand positioned in a hand gesture and derived specific parametric template of the user hand, following is an example of hand gesture recognition algorithm based on the above discussion:

Step 1: Approximate the hand region by polygonal segments. This step removes unwanted convexity points and approximates the hand contour with a polygon.

Step 2: Find the convex hull of the approximated polygon.

Step 3: Find the convexity defects of the hull. As shown in FIG. 7, every group of start points (e.g., B(1)), depth points (e.g., D(1)), and end points (e.g., E(1)) define a single contour convexity defect, where the start point indicates the start point of a contour where the defect begins; the end point indicates where the defect ends, and the depth points are the furthest points from the hull.

Step 4: Find the minimal circle or rectangular box which can cover the convex hull. The center of the circle or rectangular box is the estimation of the center of the hand, C_H.

Step 5: Filter out the convexity points which are below the center of the hand, which are not finger tips or finger joints. This part of the application assumes that the hand is positioned upwards, so that finger tips are above the center of the hand in the acquired image. Alternately, one can suppose that the hand is upside down, and the convexity points above the center of the hand would then be eliminated.

Step 6: Find the minimal circle which can cover the depth points. The center of the circle is the estimation of the center of the palm, C_P. The radius of the circle is also recorded for later use.

Figure 9A:
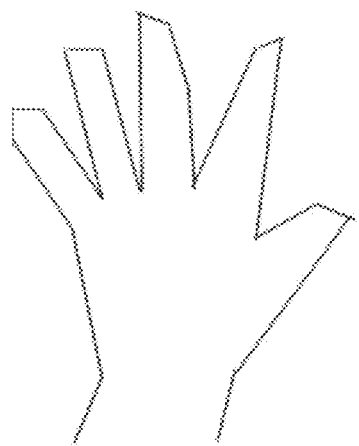
FIG. 9A is an example of a detected hand contour of a hand gesture.
Figure 9B:
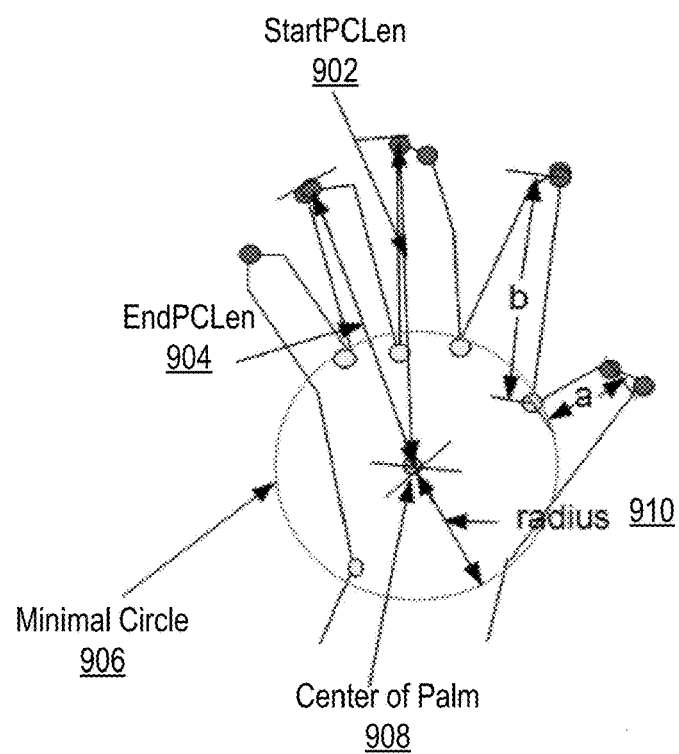
FIG. 9B illustrates the detected features of a polygonal approximating the detected hand contour depicted in FIG. 9A.

Step 7: For each convexity defect, returns 3 points: depthpoint[i], startpoint[i] and endpoint[i], respectively. Ideally, the depthpoints are located at the finger joints, while the startpoints and endpoints are on the finger tips. FIG. 9A is a detected hand contour and FIG. 9B illustrates the detected features of a polygon approximating the detected hand contour depicted in FIG. 9A. Element 902 represents the length from a startpoint[i] to the center of Palm PCenter (C_P); element 904 represents the length from an endpoint [i] to the center of Palm PCenter (C_P); element 906 represents the minimal circle which covers selected depth points; element 908 represents the center of palm (C_P); and element 910 represents the radius of the minimal circle 906.

Let (x, y) be the position of each point as described in Step 7. The following measurements are made:

The length from the startpoint[i] (red) to the center of Palm PCenter (C_P):

$$\text{startPClen}[i]=\text{sqrt}((\text{startpoint}[i].x-\text{PCenter}.x)^2+(\text{startpoint}[i].y-\text{PCenter}.y)^2),$$

The length from the end (blue) point to the C_P:

$$\text{endPClen}[i]=\text{sqrt}((\text{endpoint}[i].x-\text{PCenter}.x)^2+(\text{endpoint}[i].y-\text{PCenter}.y)^2),$$

The distance between start point to the depth point:

$$a[i]=\text{sqrt}((\text{startpoint}[i].x-\text{depthpoint}[i].x)^2+(\text{startpoint}[i].y-\text{depthpoint}[i].y)^2),$$

The distance between the end point to the depth point:

b[i]=sqrt((endpoint[i].x−depthpoint[i].x)^2+(endpoint[i].y−depthpoint[i].y)^2), and The dot product between two vectors pointing from depth point to the start and end points:

dotproduct[i]=((startpoint[i].X−depthpoint[i].X)*(endpoint[i].X−depthpoint[i].X)+(startpoint[i].Y−depthpoint[i].Y)*(endpoint[i].Y−depthpoint[i].Y))/(a[i]*b[i]).

Step 8: Finger Count. Below is an example of pseudocode of finger count:

```
//* Count fingers*//
{
    Set finguercount = 0;
    Filter out effective depthpoints;
    For each convexity defect
    {
        Finger joint indicator:
        {
            For each depthpoint in the effective depthpoint set, determine
                whether it is a finger joint. The following condition
                should be satisfied:
                1.  dotproduct[i] > 0
                2.  ((depthpoint[i]. Y − PCenter.Y)<(radius/2))
                3.  ((a[i] + b[i])/2) > (radius*0.6)
        }
    }
    Finger Indicator;
}
```

It is noted that due to the lighting condition and background, the depthpoints detected may be much more than what's showed in the captured image. Not all of depthpoints are useful and meaningful for finger detection. The above algorithm is configured to filter out effective depthpoints first. The effective depthpoint includes all the depthpoints above PCenter, which correspond to finger joints, and the points corresponding to the joint between hand and wrist. Those depthpoints together are called the effective depthpoint set. It is also noted that in some scenarios, no valid finger joint can be detected, e.g., when there is only one finger. In this case, the above algorithm is configured to detect where the single finger is present.

Figure 10:
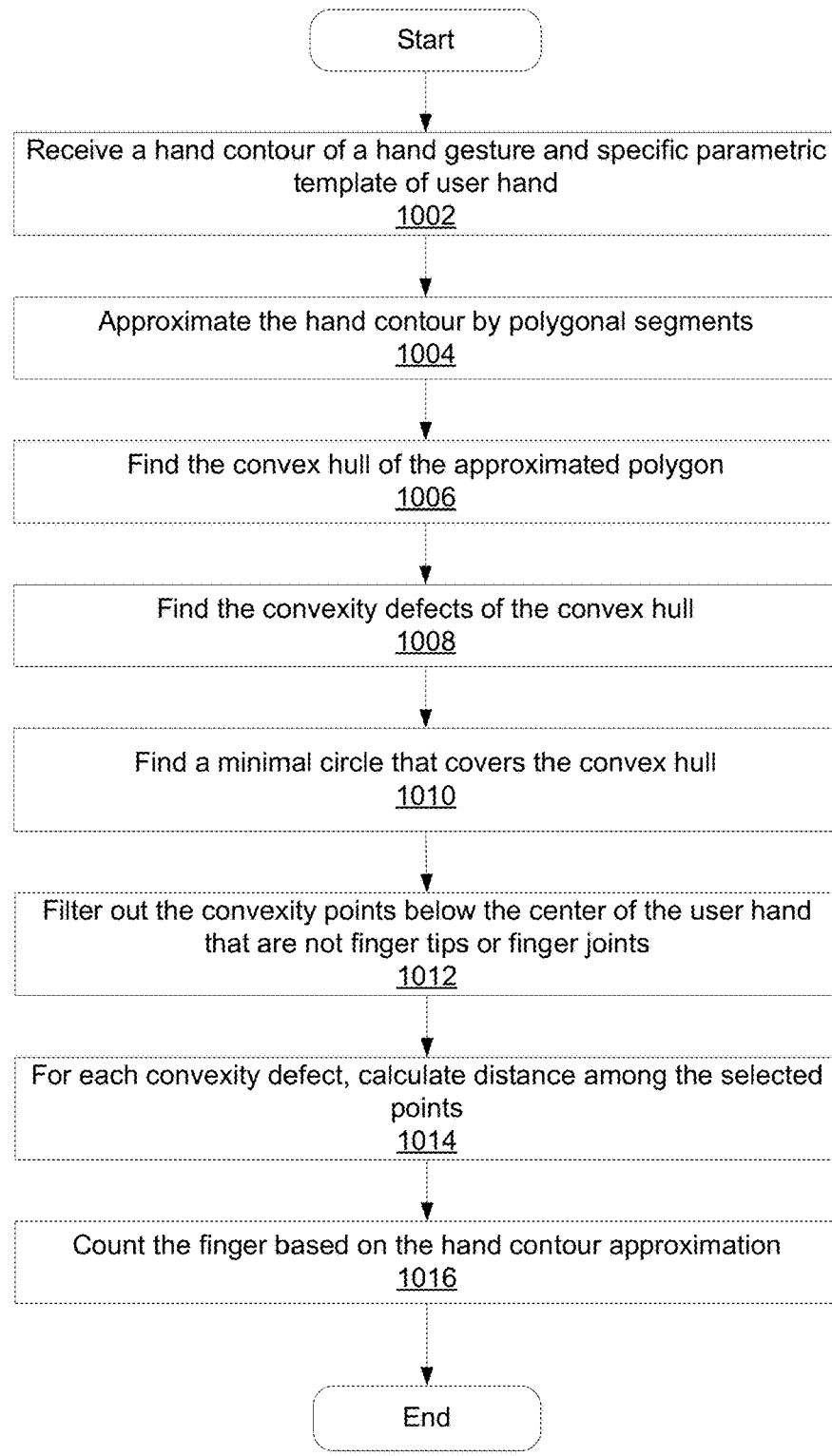
FIG. 10 is a flow chart of a process of recognizing a hand gesture by the feature recognition module illustrated in FIG. 1.

FIG. 10 is a flow chart of a process of recognizing a hand gesture by the recognition module 130 illustrated in FIG. 1. Initially, the recognition module 130 is configured to receive 1002 a hand contour of a hand gesture positioned by a user hand and a specific parametric template of the user hand. The recognition module 130 approximates 1004 the hand contour by one or more polygonal segments and finds 1006 the convex hull of the approximated polygon of the hand contour. The recognition module 130 finds 1008 the convexity defects (e.g., depth points of the hand contour) of the convex hall and finds 1010 a minimal circle that covers the convex hull. The recognition module 130 further filters 1012 out the convexity points below the center of the user hand that are not finger tips or finger joints. For each convexity defect, the recognition module 130 calculates 1014 a variety of distances among the selected points of the convex hull and counts 1016 the finger based on the hand contour approximation.

Hand Gesture Recognition—Finger Count Applications

Figure 11A:
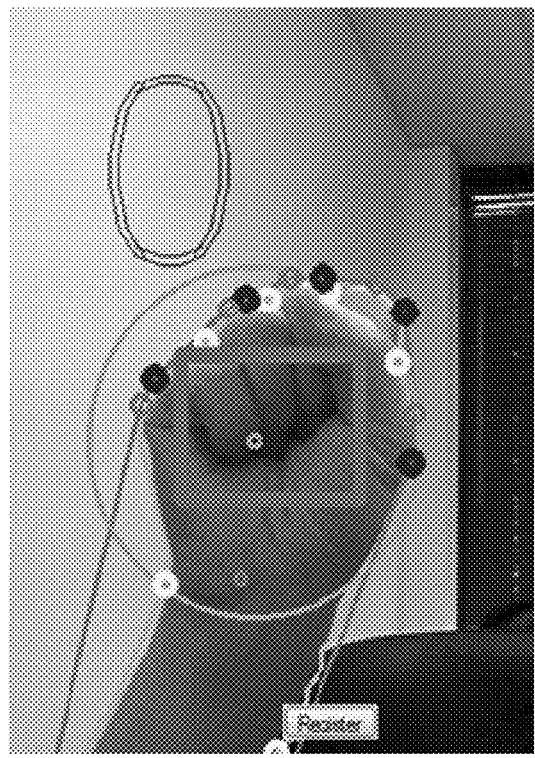
FIG. 11A illustrates an example of recognizing finger count "0" gesture positioned by a user hand in accordance with an embodiment of the invention.
Figure 11B:
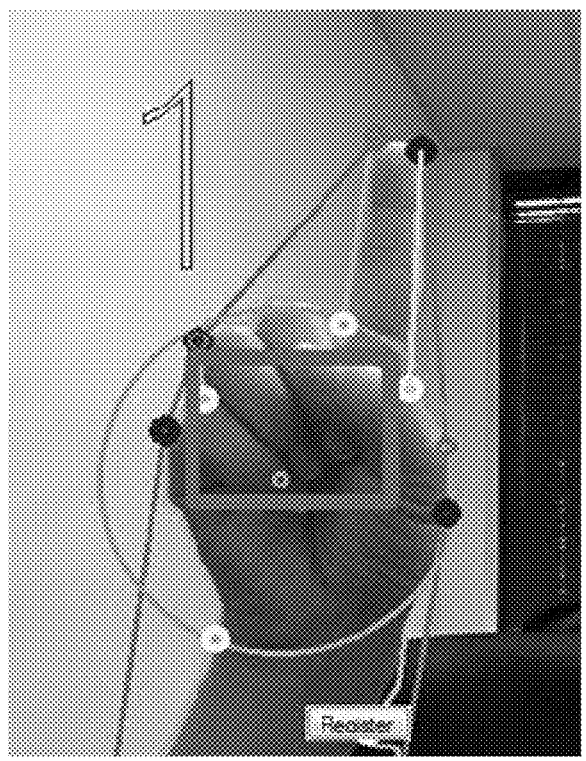
FIG. 11B illustrates an example of recognizing finger count "1" gesture positioned by a user hand with respect to finger count "0" gesture.

Two hand gestures positioned by a user hand sometimes are close to each other, which makes accurate hand gesture recognition challenging. FIG. 11A illustrates an example of finger count "0" positioned by a user hand in accordance with an embodiment of the invention. The effective depthpoints set of a fist (illustrated in FIG. 11A) are all very close to or completely within the minimal circle 1102. However, if one finger is present in a hand gesture as illustrated in FIG. 11B, although there is no valid finger join can be detected, the startPCLen and endPCLen corresponding to a real finger is much longer than the radius of the minimal circle 1102 as shown in FIG. 11A.

The following pseudo-code illustrates differentiating between a finger count "0" gesture or a fist from a finger count "1" gesture:

```
//*Finger count "0" gesture vs. Finger count "1" gesture*//
{
    threshold = radius * 1.1;
    for each i,
    if(depthpoint[i]. Y < C_H.Y)
    if ((startPClen[i] > threshold) || (endPClen[i] > threshold))
        count ++;
    if (count >0)
        fingercount = 1;
}
```

Figure 12A:
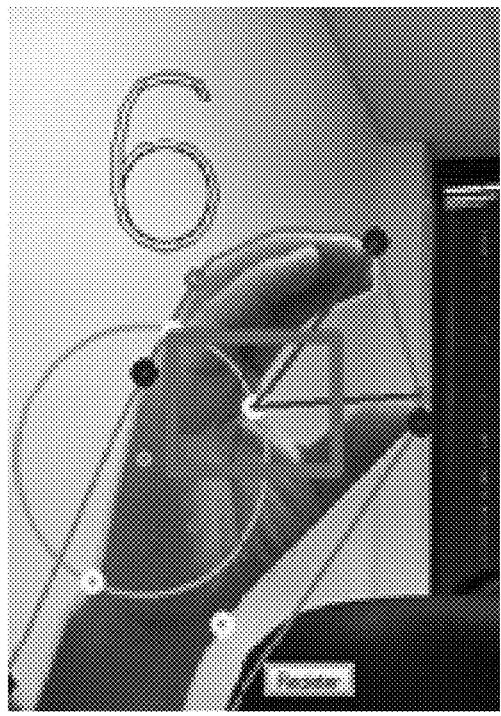
FIG. 12A illustrates an example of recognizing "Capture" gesture positioned by a user hand in accordance with an embodiment of the invention.
Figure 12B:
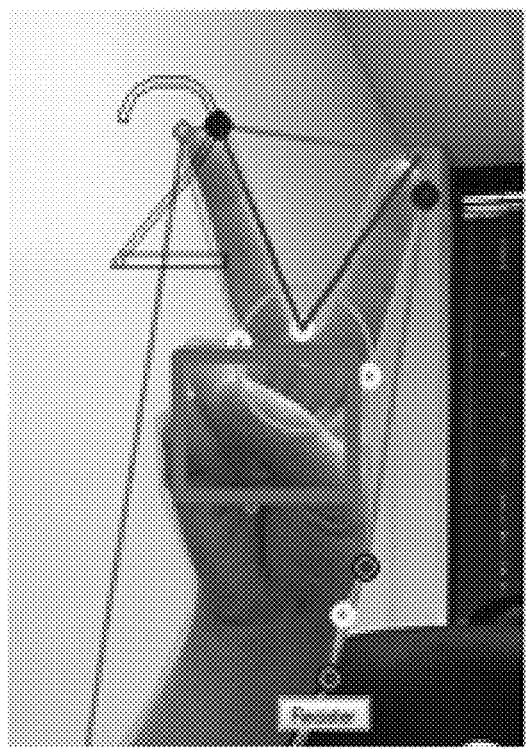
FIG. 12B illustrates an example of recognizing finger count "2" gesture positioned by a user hand with respect to finger count "Capture" gesture.

FIG. 12A illustrates an example of recognizing "Capture" gesture positioned by a user hand in accordance with an embodiment of the invention. The "Capture" gesture illustrated in FIG. 12A is initially recognized as a finger count "2" gesture as illustrated in FIG. 12B. However, the recognition module 130 observes difference between the orientation of the angles of the thumb and the rest of the fingers. The recognition module 130 further observes that the distribution of the depthpoints for "Capture" gesture and finger count "2" gesture are different, e.g., there are generally more depthpoints for the "Capture" gesture that those for finger count "2" gesture. Based on the observed differences, the recognition module 130 is configured to differentiate between the "Capture" gesture and finger count "2" gesture.

Figure 13A:
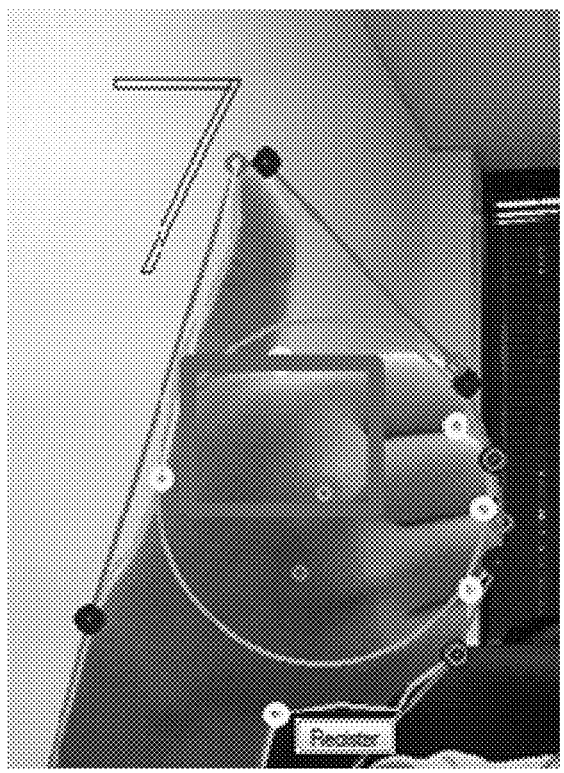
FIG. 13A illustrates an example of recognizing "Done" gesture positioned by a user hand in accordance with an embodiment of the invention.
Figure 13B:
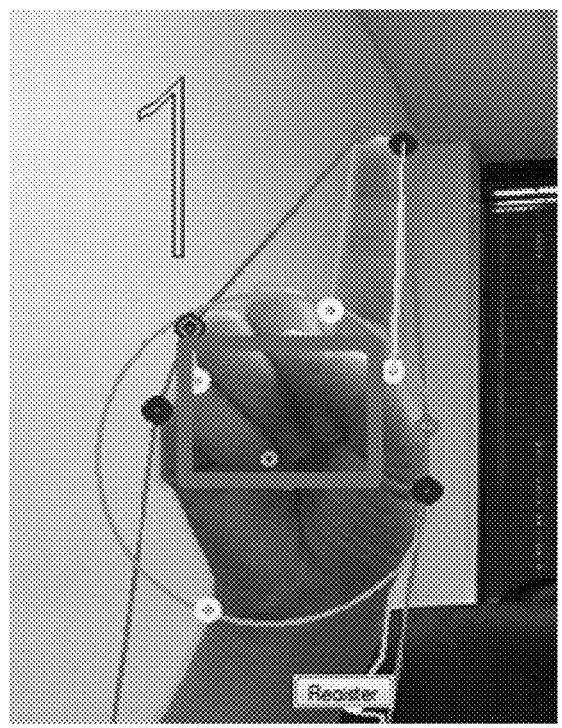
FIG. 13B illustrates an example of recognizing finger count "1" gesture positioned by a user hand with respect to finger count "Done" gesture.

FIG. 13A illustrates an example of "Done" gesture positioned by a user hand in accordance with an embodiment of the invention. FIG. 13B illustrates an example of finger count "1" gesture positioned by a user hand. The "Done" may be first recognized as finger count "1" gesture or finger count "2" gesture. However, the "Done" gesture is different from the other two gestures, at least in the following ways: (1) the finger presents at the left side of PCenter (or right side, if using the other hand); (2) the effective depthpoints at the right side of PCenter are vertically aligned for the "Done" gesture; while in other cases for finger count "1" or "2" gestures, the effective depthpoints are mostly above PCenter, and horizontally aligned; and (3) the orientation and angle between thumb and other parts of the hand are different. Based on the observed differences, the recognition module 130 is configured to separate the "Done" gesture from the finger count "1" gesture.

Figure 14A:
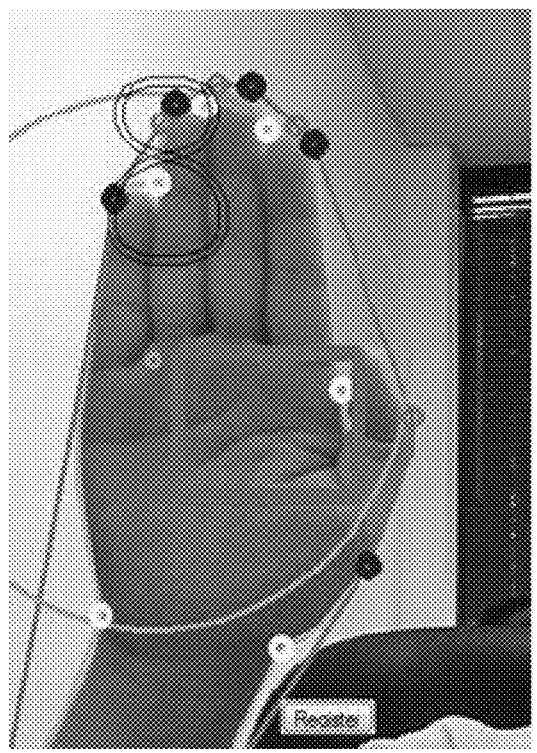
FIG. 14A illustrates an example of recognizing "Palm" gesture positioned by a user hand in accordance with an embodiment of the invention.
Figure 14B:
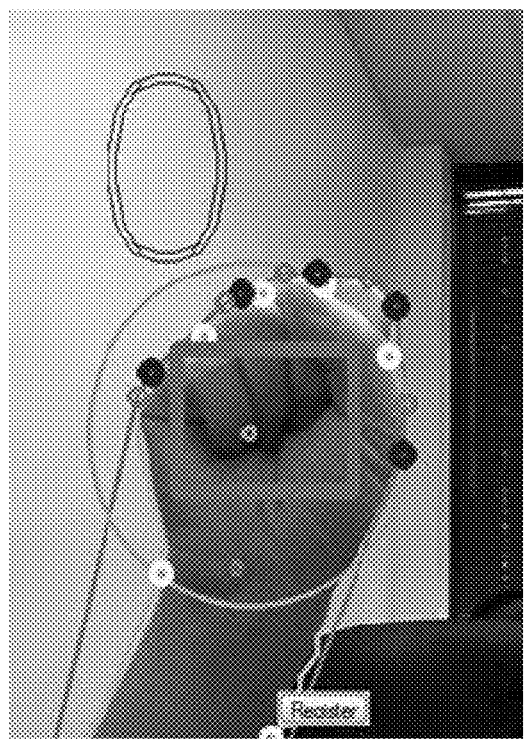
FIG. 14B illustrates an example of recognizing finger count "0" gesture positioned by a user hand with respect to finger count "Palm" gesture.
Figure 16A:
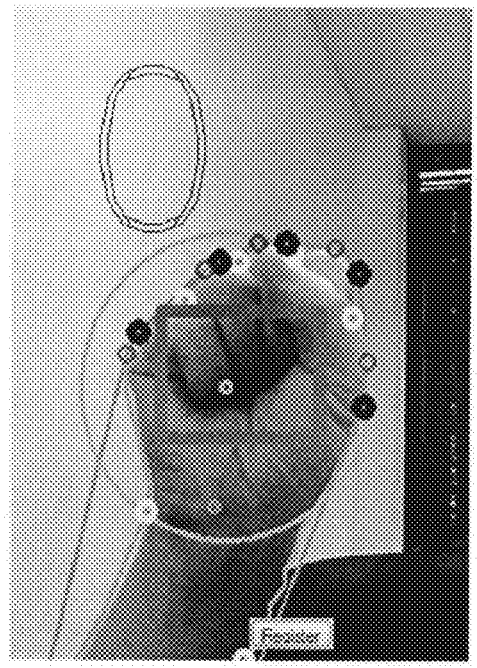
FIGS. 16A through 16D illustrate two examples of finger count "0" and "1" gestures positioned by a user hand and their corresponding detected hand contours in accordance with an embodiment of the invention.
Figure 16B:
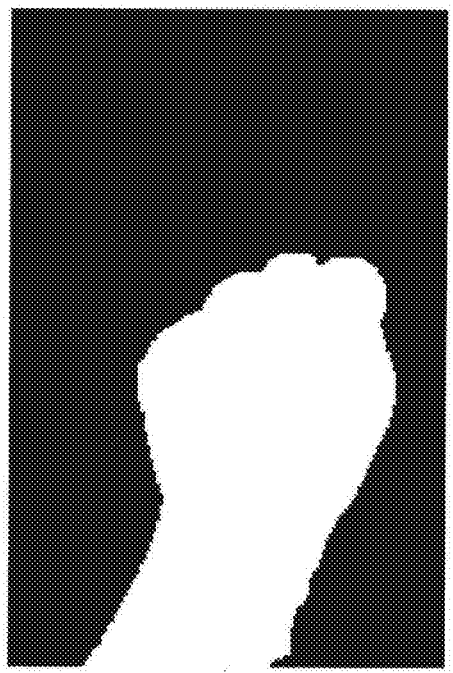
Figure 16C:
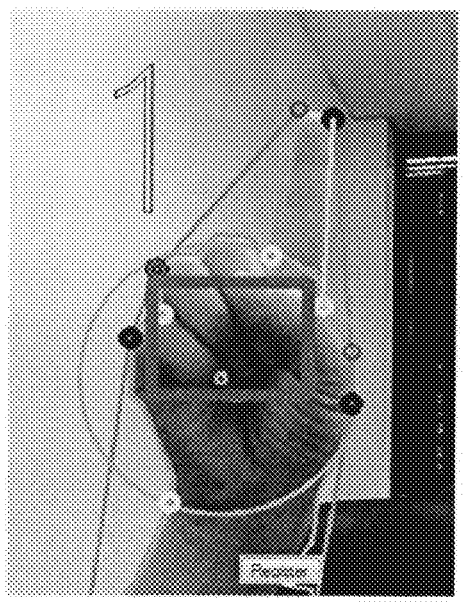
Figure 16D:
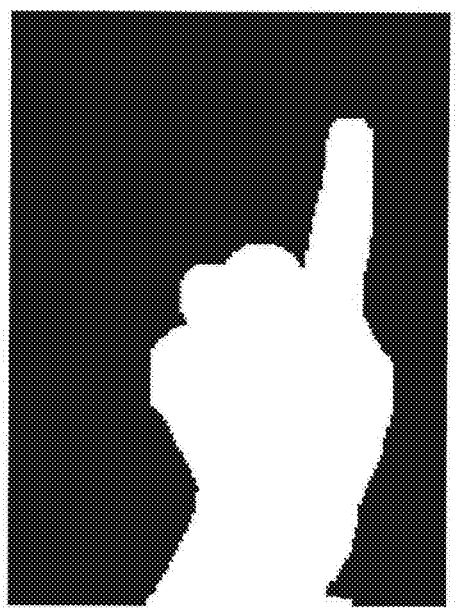
Figure 17A:
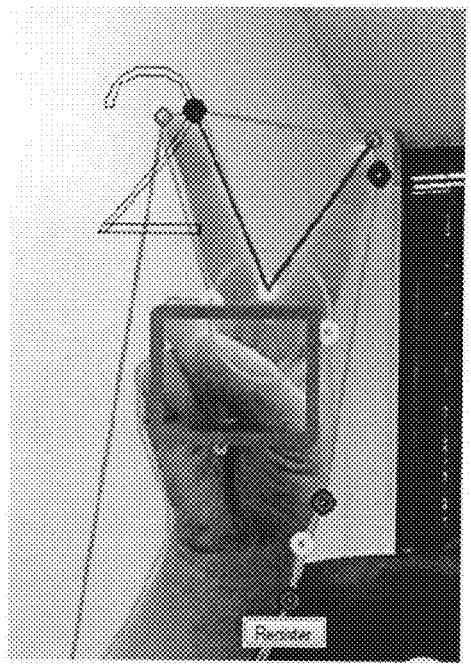
FIGS. 17A through 17D illustrate two examples of finger count "2" and "3" gestures positioned by a user hand and their corresponding detected hand contours in accordance with an embodiment of the invention.
Figure 17B:
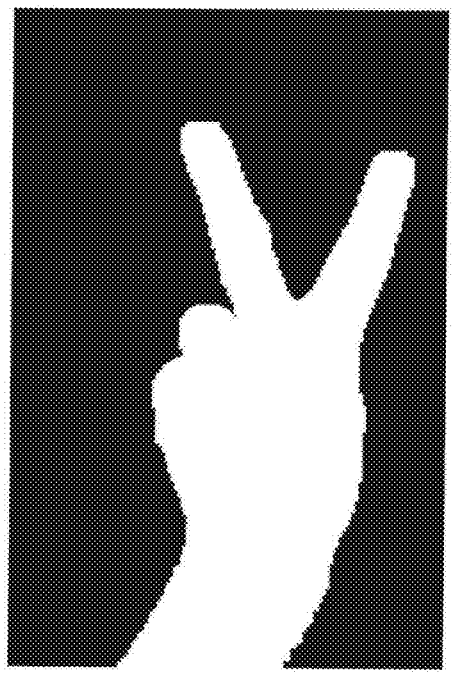
Figure 17C:
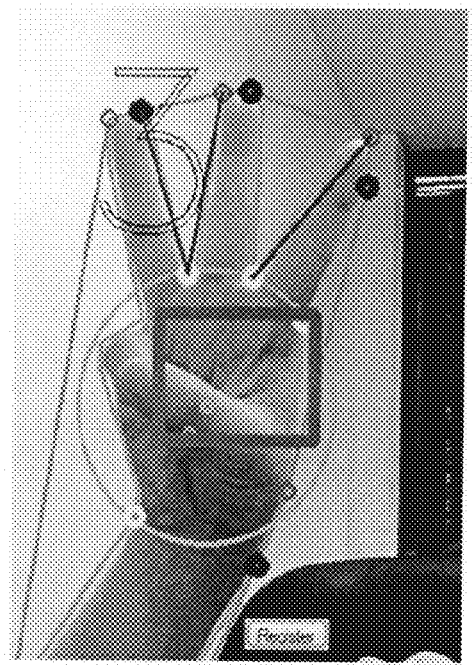
Figure 17D:
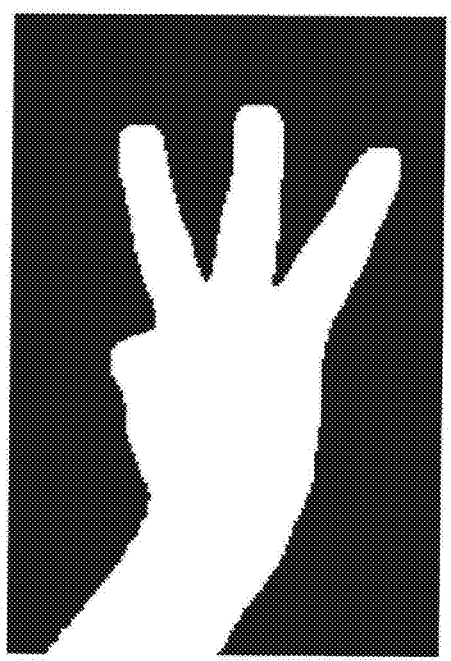
Figure 18A:
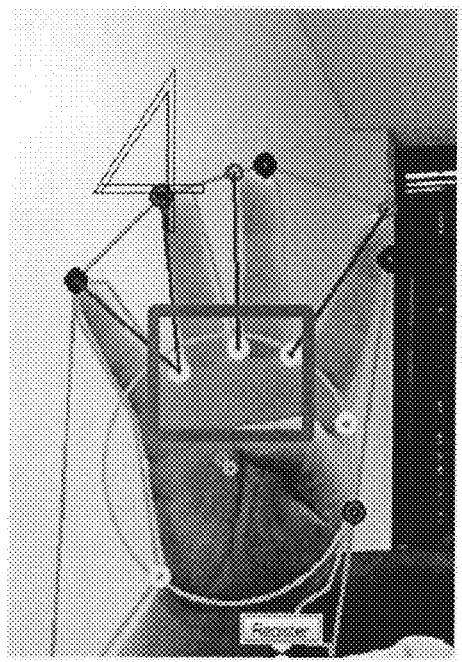
FIGS. 18A through 18D illustrate two examples of finger count "4" and "5" gestures positioned by a user hand and their corresponding detected hand contours in accordance with an embodiment of the invention.
Figure 18B:
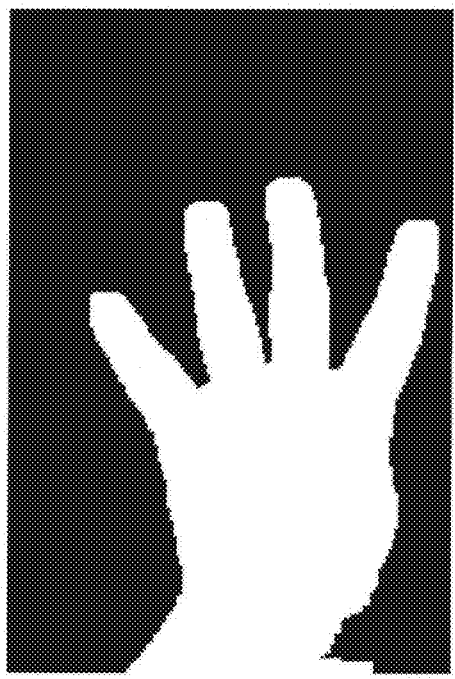
Figure 18C:
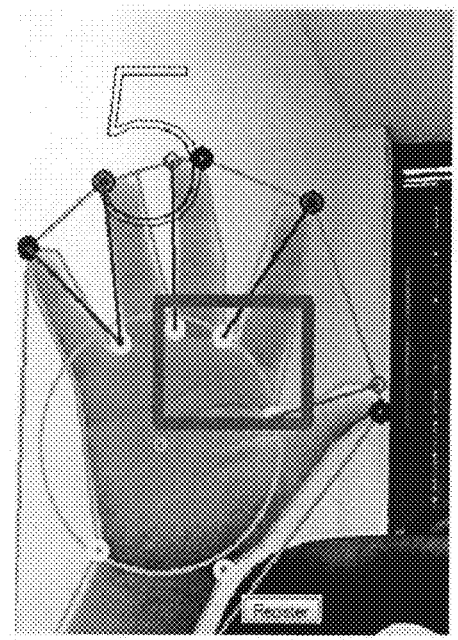
Figure 18D:
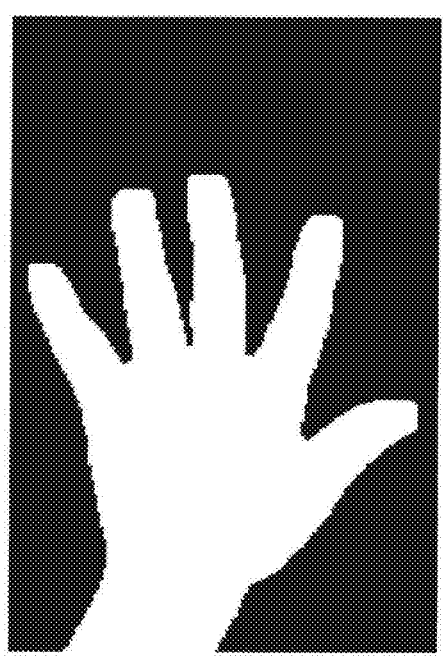
Figure 19A:
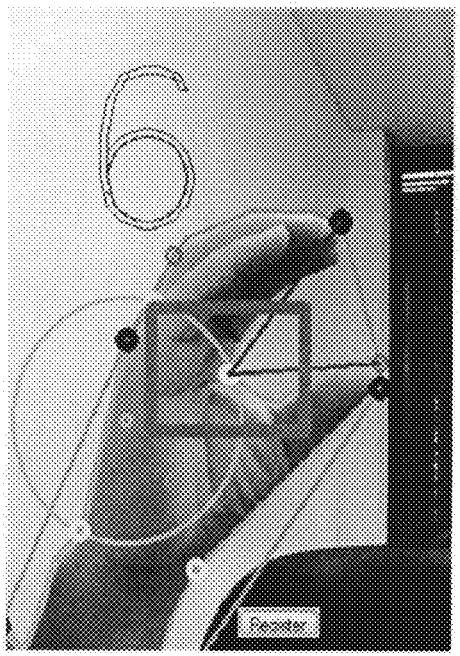
FIGS. 19A through 19D illustrate two examples of finger count "6" and "7" gestures positioned by a user hand and their corresponding detected hand contours in accordance with an embodiment of the invention.
Figure 19B:
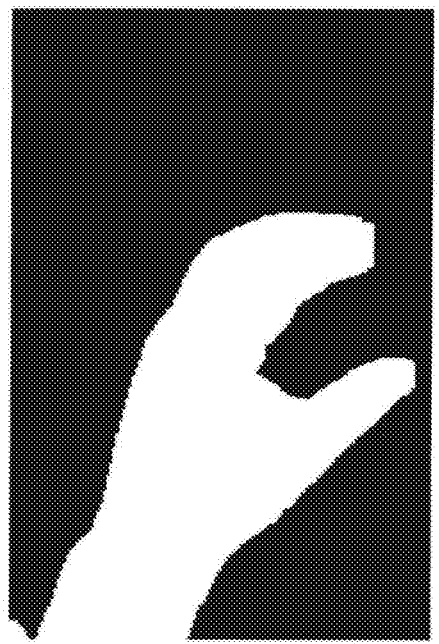
Figure 19C:
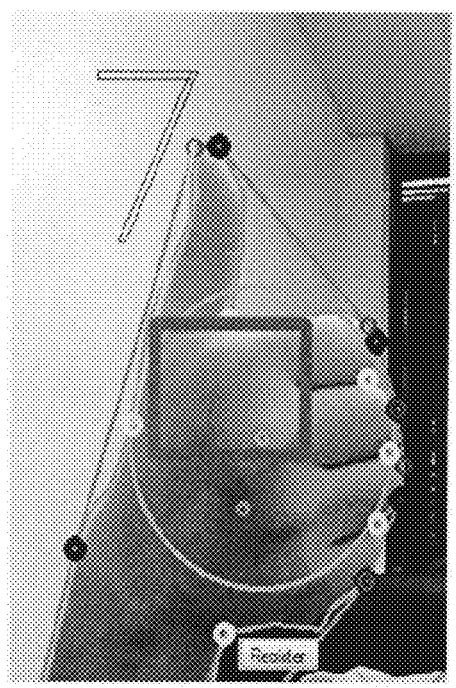
Figure 19D:
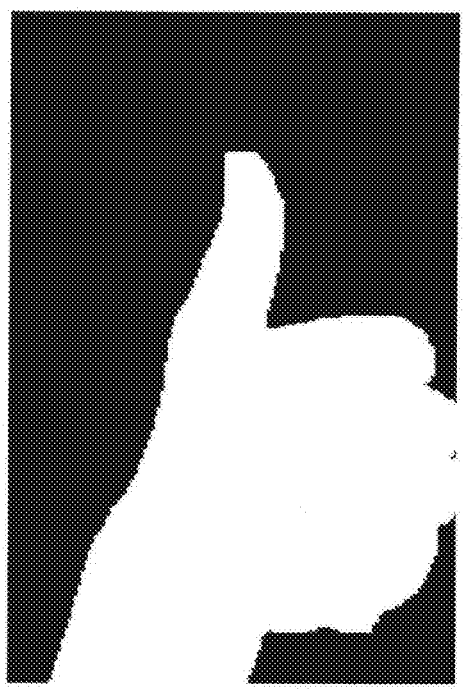

FIG. 14A illustrates an example of "Palm" gesture positioned by a user hand in accordance with an embodiment of the invention. FIG. 14B illustrates an example of finger count "0" gesture positioned by a user hand. The "Palm" gesture and finger count "0" gesture are similar in that most effective depthpoints, associated startpoints and endpoints are very close to or within the minimal circle. The differences are mainly that: (1) the radius of the "Palm" gesture is bigger; (2) due to the relative symmetry of the fist, the PCenter is located at almost the center of the fist itself, while in the "Palm" gesture, the effective depthpoints, associated startpoints are mostly clustered at one side of the minimal circle (right side in this case); and (3) the depthpoint presented beside the thumb in the "Palm" gesture makes the depthpoints cluster vertically distributed instead of horizontally distributed. Based on the observed differences, the recognition module 130 is configured to separate the "Palm" gesture from the finger count "0" gesture.

It is noted that in the examples illustrated in FIG. 11A though FIG. 14B, every parameter of the hand gesture is customized for a hand position with thumb in the right side of the screen. For the other hand position (thumb on the left), the parameters can be adjusted accordingly.

FIGS. 15A through 15F illustrate six examples of finger count gestures positioned by a user hand in accordance with an embodiment of the invention. The circle in each example indicates the estimation of palm. Thumb and other fingers in each example are identified and marked by different markers (e.g., different colored lines). The vertices of the convex hull and depth points of the user hand in each example are also identified and marked using the algorithm described above.

Figure 20A:
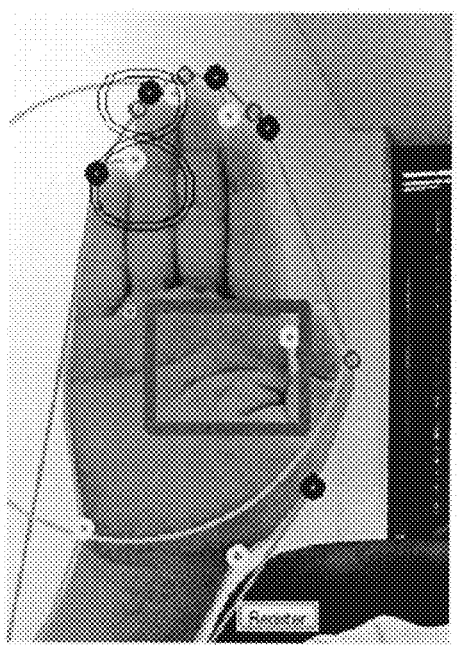
FIGS. 20A and 20B illustrate one example of finger count "8" gesture positioned by a user hand and its corresponding detected hand contour in accordance with an embodiment of the invention.
Figure 20B:
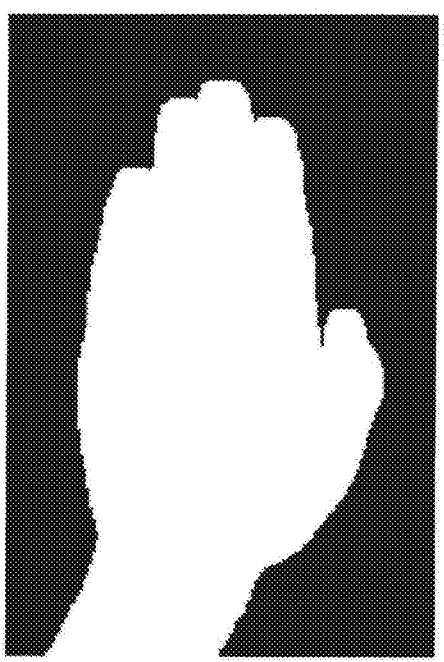

FIGS. 16A through 16D, FIGS. 17A through 17D, FIGS. 18A through 18D, FIGS. 19A through 19D, and FIGS. 20A and 20B illustrate examples of hand gesture recognition simulated in a software application executed in a computer with Window-based operation system. For example, FIGS. 16A through 16D illustrate two examples of finger count "0" and "1" gestures positioned by a user hand and their corresponding detected hand contours in accordance with an embodiment of the invention. FIGS. 17A through 17D illustrate two examples of finger count "2" and "3" gestures positioned by a user hand and their corresponding detected hand contours in accordance with an embodiment of the invention. FIGS. 18A through 18D illustrate two examples of finger count "4" and "5" gestures positioned by a user hand and their corresponding detected hand contours in accordance with an embodiment of the invention. FIGS. 19A through 19D illustrate two examples of finger count "6" and "7" gestures positioned by a user hand and their corresponding detected hand contours in accordance with an embodiment of the invention. FIGS. 20A and 20B illustrate one example of finger count "8" gesture positioned by a user hand and its corresponding detected hand contour in accordance with an embodiment of the invention.

Application of Hand Gesture Recognition—"Let's Count!"

Embodiments of the disclosed human visual gestures recognition have a variety of applications, including educational applications teaching kids to learn finger count. FIG. 21A through FIG. 24 illustrate a mobile application that integrates the hand gesture recognition as discussed above. The mobile application, called "Let's Count!" is designed as a video game to engage a user to learn finger counts, e.g., 1-5, by requiring the user to show the required finger count and to provide interactive feedback to the user. Other applications may include the use of body gesture recognition and facial feature recognition using the similar principles.

The "Let's Count!" video game includes four activities: main activity, splash screen activity, game image view activity and game animation activity. The main activity includes creating user interface for interacting with users; launching finger counting activities and starting the video game. The splash screen activity includes displaying a company logo for a few seconds, e.g., 2 seconds, and returning to main activity screen for the video game. The game image view activity includes displaying the logo of the video game and starting "main activity." The game animation activity includes displaying animation of fingers, e.g., displaying images of finger count gestures of "1" to "5," playing a sound in the background corresponding to the image being displayed, and sending appropriate results to the "main activity."

Figure 21A:
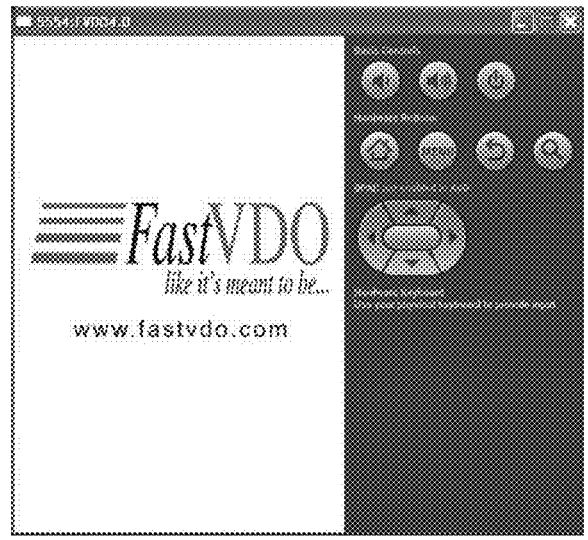
FIG. 21A is a screen shot of "Let's Count!" video game with hand gesture recognition in accordance with an embodiment of the invention.
Figure 21B:
FIG. 21B is anther screen shot of "Let's Count!" video game with hand gesture recognition in accordance with an embodiment of the invention.

FIG. 21A is a screen shot of "Let's Count!" video game implementing hand gesture recognition in accordance with an embodiment of the invention. The video game starts with displaying "FastVDO" company logo for two seconds, sends the result to "main activity" and exits. FIG. 21B is anther screen shot of "Let's Count!" video game showing logo of the video game.

Figure 22A:
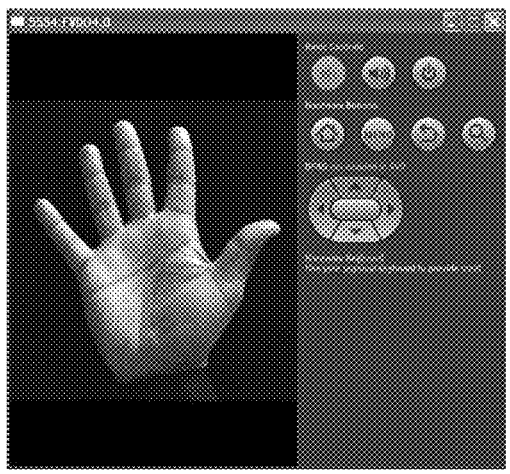
FIG. 22A is a screen shot of "Let's Count!" video game showing a hand gesture for recognition in accordance with an embodiment of the invention.
Figure 22B:
FIG. 22B is a screen shot of "Let's Count!" video game showing finger count "5" gesture for recognition in accordance with an embodiment of the invention.
Figure 22C:
FIG. 22C is a screen shot of "Let's Count!" video game showing a response to correct recognition of finger count "5" gesture in accordance with an embodiment of the invention.

FIG. 22A is a screen shot of "Let's Count!" video game showing a hand gesture for recognition, i.e., finger count "5" gesture. FIG. 22B is a screen shot of "Let's Count!" video game showing finger count "5" gesture for recognition, requesting a user to show the finger count "5." Responsive to the user showing the correct finger count, the video game provides interactive feedback, such as showing a message of "Great . . . " on the display screen of a mobile phone. FIG. 22C is a screen shot of "Let's Count!" video game showing a response to correct recognition of finger count "5" gesture in accordance with an embodiment of the invention.

Figure 23:
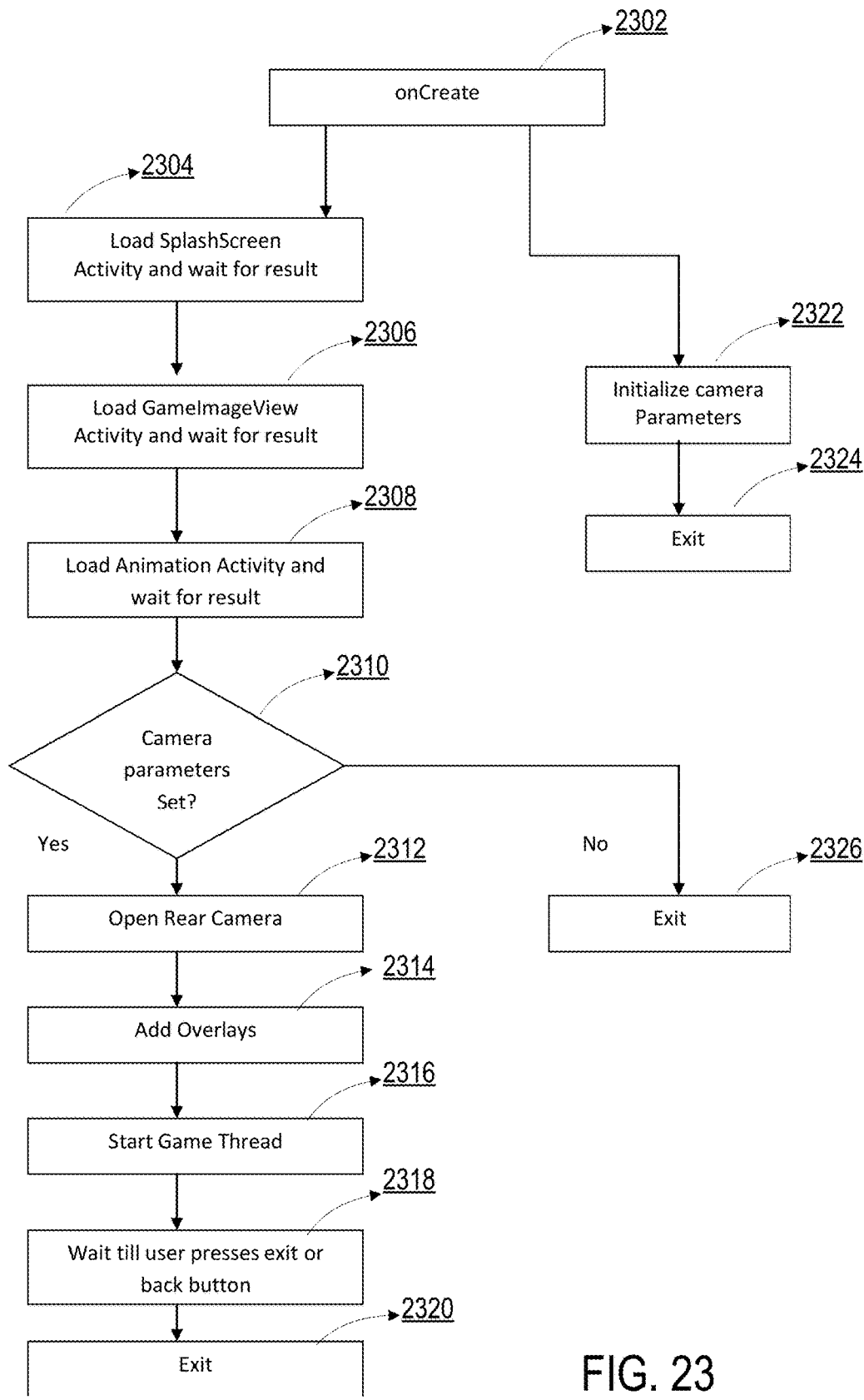
FIG. 23 is a flow chart of a process of main activity for playing "Let's Count!" video game in accordance with an embodiment of the invention.

FIG. 23 is a flow chart of a process of main activity for playing "Let's Count!" video game in a mobile phone in accordance with an embodiment of the invention. The main activity starts with a "onCreate" function call 2302 and loads 2304 splash screen activity (e.g., showing FastVDO company logo for two seconds) and waits for result. The main activity also loads 2306 game image view activity (e.g., the logo of "Let's Count!" video game) and waits for result. After the game view activity returns, the main activity loads 2308 animation activity (e.g., showing a finger count gesture) and waits for result.

Responsive to camera parameters of a camera of the mobile phone being set 2310, the main activity opens 2312 the rear camera of the mobile phone, adds 2314 overlays to the displayed image of the finger count gesture and starts 2316 a game thread. In response to a user pressing "exit" or "back" button of the mobile phone 2318, the main activity exits 2320. Parallel to the activities described above, in response to "onCreate" function call, the main activity also initializes 2322 camera parameters of the camera of the mobile phone and returns 2324 the result of the camera parameters initialization. In response to the camera parameters not being set, the main activity exits 2326 the video game.

Figure 24:
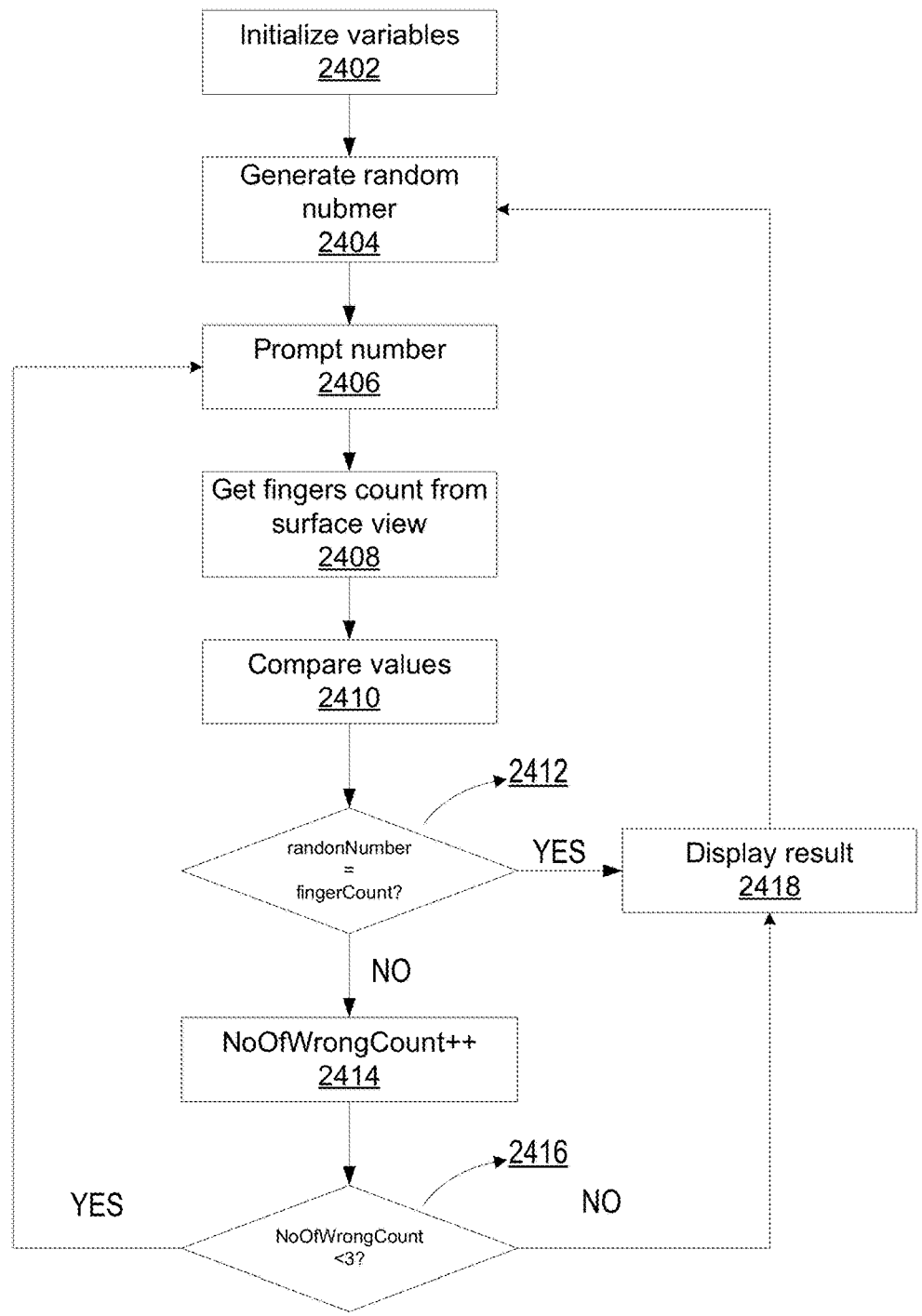
FIG. 24 is a flow chart of a process for creating a game thread for playing "Let's Count!" video game in accordance with an embodiment of the invention.

FIG. 24 is a flow chart of a process for creating a game thread for playing "Let's Count!" video game in accordance with an embodiment of the invention. The game thread initializes 2402 variables for various functions calls and generates 2404 a random number that can be represented by a hand gesture positioned by one or more fingers of a user hand. The game thread prompts 2406 the number, which creates a function call message to a method that displays the number on the display screen. The game thread gets 2408 fingers counts from a surface view by sending a request to a preview surface to process frames of the display. The game thread waits for multiple frames (e.g., three frames) being processed. In response to the completion of processing the frames, the game thread gets the result from the preview surface, which is a finger count.

The game thread compares 2410 the results returned from the preview surface with the generated random number. If the finger count is equal to the random number 2412, the game thread displays 2418 the result. If the finger count is not equal to the random number, the game thread increases 2414 a count that records the number of times the user counted the finger wrong. Response to the count of wrongly counted fingers being smaller than three 2416, the user is allowed to try again to count the finger, otherwise, the game thread displays 2418 the result and generates 2404 another random number for the user to count.

A Visual Language with Human Visual Gestures

Embodiments of the computer system 100 described above recognize individual human visual gestures, such as hand gesture, facial gesture and body gestures, and translate the recognized human visual gestures based a dictionary with a known set of recognized human visual gestures, e.g., hand gestures of the American Sign Language. Another embodiment of the invention develops simple visual codes to express commands to capture, reference, edit, or transmit multimedia messages, which are specifically useful in real-time multimedia applications in a mobile communications environment.

In one embodiment, the computer system 100 is configured to combine multiple human visual gestures to create the visual codes or "visual grammar", which can be used as elaborate and comprehensive commands beyond what a single human visual gesture can communicate. From the visual codes created based on multiple human visual gestures, the computer system 100 is further configured to create specialized shortcuts (also called "shorthand instruction codes"). A multi-gesture code and one or more shortcuts associated with it form a hierarchy, which is useful in terms of usage and the capabilities of transmitting and receiving devices and learning systems using the visual codes.

One application of the multi-gesture visual codes is video editing. Video editing is known to be a complicated process, requiring not only knowledge of video and audio feature metadata, such as formats, bitrates, frame rates, etc., but also appropriate selection of audio-video signal processing techniques, e.g., blue screening, layering, fading, blending, etc. Video editing only recently becomes a widely used consumer application with very limited applications in wireless communications environment. Embodiments of the invention provide a solution to video editing using recognized human visual gestures in the mobile communications environment. A further description of embodiments of video editing is provided in U.S. Pat. No. 8,107,599, which is incorporated by reference in its entirety herein.

Figure 25:
FIG. 25 illustrates example video editing commands based on one or more recognized human visual gestures and possible indications via the commands.

One embodiment of the visual codes includes a limited number of key commands, and provides users an opportunity to invent their own important commands, using their own visual codes (and codes of codes). Specifically, the visual codes include commands to capture, splice, blend, and otherwise manipulate a video. FIG. 25 illustrates a table of example video editing commands and possible indications via the commands. A video editing command can be inputted into a computing device, e.g., a smartphone, by a variety of buttons (e.g., from pull-down menus), text, voice, and/or visual actions. Each video editing command has a corresponding text expression and/or a visual expression, and one or more human visual gestures that form the command.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for recognizing hand gestures, the method comprising:

presenting a region of interest (ROI) on a display;

receiving a digital color image of a user hand against a background, the digital color image captured using a digital image capturing device, the digital color image being represented by pixels in a first color space;

selecting a set of pixels of the digital color image in the first color space from the pixels of the digital color image within the ROI, the selected set of pixels of the digital color image in the first color space describing a general parametric model associated with the digital color image in the first color space;

obtaining specific parametric templates in additional color spaces, each specific parametric template in a color space comprising a selected set of pixels within the ROI representing the user hand in a corresponding color space of the additional color spaces, the additional color spaces emphasizing chrominance over luminance information;

combining the specific parametric templates in the additional color spaces to generate an updated specific parametric template;

obtaining a contour of the user hand by applying the updated specific parametric template to subsequent digital images of the user hand; and detecting a hand gesture based on the contour of the user hand.

2. The computer-implemented method of claim 1, wherein obtaining the contour of the user hand comprises:

identifying points corresponding to finger tips and convex hulls between the finger tips in the subsequent digital images of the user hand based on the updated specific parametric template; and generating a polygonal contour map of the user hand based on the identified points.

3. The computer-implemented method of claim 2, wherein identifying the points comprises:

detecting one or more convexity defects of the convex hulls, a convexity defect comprising a start point, a depth point and an end point;

identifying a center of the digital color image of the user hand; and filtering one or more points that do not represent finger tips or finger joints of the user hand.

4. The computer-implemented method of claim 2, wherein detecting the hand gesture comprises analyzing a structure, orientation and motion of the user hand based on the polygonal contour map through a nonlinear classifier to select the hand gesture from a pre-defined vocabulary of gestures.

5. The computer-implemented method of claim 4, wherein a first color space model of the two independent color space models is selected from a hue-saturation-value color space and the first color space model is represented by hue, saturation and value parameters.

6. The computer-implemented method of claim 5, wherein a second color space model of the two independent color space models is selected from a luma-chroma color space and the second color space model is represented by luma and chroma parameters.

7. The computer-implemented method of claim 4, wherein applying the two independent color space models to the digital color image of the user hand comprises:

for a color space of a color space model chosen from the color spaces of the two independent color space models:

calculating one or more first-order statistics of the color space model in the chosen color space;

calculating one or more first-order statistics of the color space model in a red-green-blue color space;

determining distribution ranges of each parameter of the chosen color space model in the chosen color space; and determining distribution ranges of each parameter of the chosen color space model in the red-green-blue color space.

8. The computer-implemented method of claim 4, further comprising:

generating an updated skin map of the user hand by:

performing a logical inclusive OR operation to the two generated skin maps, the logical inclusive OR operation selecting a pixel of the digital color image of the user hand responsive to the pixel being in one of the two generated skin maps; and generating the updated skin map of the user hand based on the logical inclusive OR operation.

9. A non-transitory computer readable medium storing instructions for recognizing hand gestures, the instruction when executed by one or more processors cause the one or more processors to:

present a region of interest (ROI) on a display;

receive a digital color image of a user hand against a background, the digital color image captured using a digital image capturing device, the digital color image being represented by pixels in a first color space;

select a set of pixels of the digital color image in the first color space from the pixels of the digital color image within the ROI, the selected set of pixels of the digital color image in the first color space describing a general parametric model associated with the digital color image in the first color space;

obtain specific parametric templates in additional color spaces, each specific parametric template in a color space comprising a selected set of pixels within the ROI representing the user hand in a corresponding color space of the additional color spaces, the additional color spaces emphasizing chrominance over luminance information;

combine the specific parametric templates in the additional color spaces to generate an updated specific parametric template;

obtain a contour of the user hand by applying the updated specific parametric template to subsequent digital images of the user hand; and detect a hand gesture based on the contour of the user hand.

10. A computer implemented method for recognizing a visual gesture, the method comprising:

receiving a first set of images including a part of a human body within a region of interest (ROI), the part of a human body oriented in a first configuration;

registering a flesh tone of the part of the human body within the ROI of the first set of images in a first color space and a second color space;

receiving a second set of images including the part of the human body, the part of the human body oriented in different configurations than the first configuration, the part of the human body oriented in the different configurations representing a visual gesture;

identifying one or more objects in the second set of images corresponding to the part of the human body based on the registered flesh tone in the first color space and the second color space;

obtaining motion vectors of the one or more objects in the second set of images by tracking the one or more objects in the second set of images; and determining the visual gesture represented by the part of the human body oriented in the different configurations according to the identified one or more objects and the motion vectors.

11. The computer implemented method of claim 10, wherein the part of the human body is a hand, a face, or an entire body.

12. A computer-implemented method for recognizing hand gestures in video imagery, wherein the hand gesture has a static element, a motion element, or a mixture of the two, the method comprising:

pre-registering a user hand, using one or multiple frames of the video;

performing an adaptive hand-detection on subsequent video frames, performing an adaptive hand-detection comprising:
  applying at least one of skin color/tone analysis in color spaces and motion estimation, to segment regions or objects, especially a hand, within the video frames,
  wherein said skin color/tone analysis in color spaces comprises:
    using skin tone analysis in one or more color spaces, to obtain skin map(s),
    merging skin maps from the one or more color spaces, and
    using an adaptive threshold to segment a region or object by detecting skin pixels and grouping them together, and
  wherein said motion estimation comprises:
    obtaining motion vector fields between two successive frames, typically for blocks within video frames,
    tracking motion vectors on subsequent frames,
    applying a combination of cluster analysis of motion vectors, and
    tracking the evolution of motion vectors on spatial regions and their features; and
  recognizing a hand gesture in part by applying at least one of the following four tool groups: (i) skin color/tone analysis in one or more color spaces, (ii) motion estimation, (iii) morphological operations, and (iv) other image processing tools, on regions or objects, especially a segmented hand, to detect hands, hand contours and their features, as well as any motion of hand parts;
  wherein said skin color/tone analysis in one or more color spaces comprises:
    using skin tone analysis in one or more color spaces, to obtain skin map(s),
    merging skin maps from the one or more color spaces, and
    using an adaptive threshold to segment a region or object by detecting skin pixels and grouping them together,
  wherein said motion estimation comprises:
    obtaining motion vectors between two successive frames, typically for blocks within video frames,
    tracking motion vectors on subsequent frames, and
    applying any combination of cluster analysis of motion vectors, and tracking the evolution of motion vectors, defined spatial regions and their features, to detect regions or objects within video frames,
  wherein said morphological operations include dilations, erosions, opening, and closing operations, and
  wherein said other image processing tools include measuring distances, angles, extrema points, convexity, and shape on hand contours.

13. The method of claim 12, wherein the analysis of the evolution of tracked motion vectors includes calculating the spatial position of an object from following the time history of motion vectors, in two or three-dimensional space.

14. The method of claim 12, wherein the adaptive hand-detection processes include at least one of the subprocesses: position, motion, and shape based processing.

15. The method of claim 12, wherein the hand gesture recognition processes include a position-based gesture recognition process, wherein the position-based gesture recognition process includes analysis of the evolution of tracked motion vectors up to a given video frame.

16. The method of claim 12, wherein the hand gesture recognition processes include a motion-based gesture recognition process, wherein the motion-based gesture recognition process includes analysis of the evolution of motion vectors over multiple frames.

17. The method of claim 12, wherein the hand gesture recognition processes include a shape-based gesture recognition process, wherein the shape-based gesture recognition process includes any combination of skin tone analysis in color spaces, morphological operations, and applying other image processing tools over the plurality of pixels.

18. The method of claim 12, wherein the hand gesture recognition processes include at least two of the subprocesses: position, motion, and shape based processing.

19. The non-transitory computer readable medium of claim 9, wherein the instructions when executed by the one or more processors cause the one or more processors to obtain the contour of the user hand by:
  identifying points corresponding to finger tips and convex hulls between the finger tips in the subsequent digital images of the user hand based on the updated specific parametric template; and
  generating a polygonal contour map of the user hand based on the identified points.

20. The non-transitory computer readable medium of claim 19, wherein the instructions when executed by the one or more processors cause the one or more processors to identify the points by:
  detecting one or more convexity defects of the convex hulls, a convexity defect comprising a start point, a depth point and an end point;
  identifying a center of the digital color image of the user hand; and
  filtering one or more points that do not represent finger tips or finger joints of the user hand.

21. The non-transitory computer readable medium of claim 19, wherein the instructions when executed by the one or more processors cause the one or more processors to detect the hand gesture by analyzing a structure, orientation and motion of the user hand based on the polygonal contour map through a nonlinear classifier to select the hand gesture from a pre-defined vocabulary of gestures.

22. The non-transitory computer readable medium of claim 21, wherein a first color space model of the two independent color space models is selected from a hue-saturation-value color space and the first color space model is represented by hue, saturation and value parameters.

23. The non-transitory computer readable medium of claim 22, wherein a second color space model of the two independent color space models is selected from a luma-chroma color space and the second color space model is represented by luma and chroma parameters.

24. The non-transitory computer readable medium of claim 21, wherein applying the two independent color space models to the digital color image of the user hand comprises:
  for a color space of a color space model chosen from the color spaces of the two independent color space models:
    calculating one or more first-order statistics of the color space model in the chosen color space;
    calculating one or more first-order statistics of the color space model in a red-green-blue color space;
    determining distribution ranges of each parameter of the chosen color space model in the chosen color space; and determining distribution ranges of each parameter of the chosen color space model in the red-green-blue color space.

25. The non-transitory computer readable medium of claim 21, wherein the instructions when executed by the one or more processors cause the one or more processors to:
generate an updated skin map of the user hand by:
perform a logical inclusive OR operation to the two generated skin maps, the logical inclusive OR operation selecting a pixel of the digital color image of the user hand responsive to the pixel being in one of the two generated skin maps; and
generate the updated skin map of the user hand based on the logical inclusive OR operation.

26. An apparatus for recognizing hand gestures, the apparatus comprising:
a computer processor for performing steps comprising:
presenting a region of interest (ROI) on a display;
receiving a digital color image of a user hand against a background, the digital color image captured using a digital image capturing device, the digital color image being represented by pixels in a first color space;
selecting a set of pixels of the digital color image in the first color space from the pixels of the digital color image within the ROI, the selected set of pixels of the digital color image in the first color space describing a general parametric model associated with the digital color image in the first color space;
obtaining specific parametric templates in additional color spaces, each specific parametric template in a color space comprising a selected set of pixels within the ROI representing the user hand in a corresponding color space of the additional color spaces, the additional color spaces emphasizing chrominance over luminance information;
combining the specific parametric templates in the additional color spaces to generate an updated specific parametric template;
obtaining a contour of the user hand by applying the updated specific parametric template to subsequent digital images of the user hand; and
detecting a hand gesture based on the contour of the user hand.

27. The apparatus of claim 26, wherein obtaining the contour of the user hand comprises:
identifying points corresponding to finger tips and convex hulls between the finger tips in the subsequent digital images of the user hand based on the updated specific parametric template; and
generating a polygonal contour map of the user hand based on the identified points.

28. The apparatus of claim 27, wherein identifying the points comprises:
detecting one or more convexity defects of the convex hulls, a convexity defect comprising a start point, a depth point and an end point;
identifying a center of the digital color image of the user hand; and
filtering one or more points that do not represent finger tips or finger joints of the user hand.

29. The apparatus of claim 27, wherein detecting the hand gesture comprises analyzing a structure, orientation and motion of the user hand based on the polygonal contour map through a nonlinear classifier to select the hand gesture from a pre-defined vocabulary of gestures.

30. The apparatus of claim 29, wherein a first color space model of the two independent color space models is selected from a hue-saturation-value color space and the first color space model is represented by hue, saturation and value parameters.

31. The apparatus of claim 30, wherein a second color space model of the two independent color space models is selected from a luma-chroma color space and the second color space model is represented by luma and chroma parameters.

32. The apparatus of claim 29, wherein applying the two independent color space models to the digital color image of the user hand comprises:
for a color space of a color space model chosen from the color spaces of the two independent color space models:
calculating one or more first-order statistics of the color space model in the chosen color space;
calculating one or more first-order statistics of the color space model in a red-green-blue color space;
determining distribution ranges of each parameter of the chosen color space model in the chosen color space; and
determining distribution ranges of each parameter of the chosen color space model in the red-green-blue color space.

33. The apparatus of claim 29, further comprising:
generating an updated skin map of the user hand by:
performing a logical inclusive OR operation to the two generated skin maps, the logical inclusive OR operation selecting a pixel of the digital color image of the user hand responsive to the pixel being in one of the two generated skin maps; and
generating the updated skin map of the user hand based on the logical inclusive OR operation.

34. A non-transitory computer readable medium storing instructions for recognizing a visual gesture, the instruction when executed by one or more processors cause the one or more processors to:
receive a first set of images including a part of a human body within a region of interest (ROI), the part of a human body oriented in a first configuration;
register a flesh tone of the part of the human body within the ROI of the first set of images in a first color space and a second color space;
receive a second set of images including the part of the human body, the part of the human body oriented in different configurations than the first configuration, the part of the human body oriented in the different configurations representing a visual gesture;
identify one or more objects in the second set of images corresponding to the part of the human body based on the registered flesh tone in the first color space and the second color space;
obtain motion vectors of the one or more objects in the second set of images by tracking the one or more objects in the second set of images; and
determine the visual gesture represented by the part of the human body oriented in the different configurations according to the identified one or more objects and the motion vectors.

35. The non-transitory computer readable medium of claim 34, wherein the part of the human body is a hand, a face, or an entire body.

36. An apparatus for recognizing a visual gesture, the apparatus comprising:

a computer processor for performing steps comprising:
receive a first set of images including a part of a human body within a region of interest (ROI), the part of a human body oriented in a first configuration;
register a flesh tone of the part of the human body within the ROI of the first set of images in a first color space and a second color space;
receive a second set of images including the part of the human body, the part of the human body oriented in different configurations than the first configuration, the part of the human body oriented in the different configurations representing a visual gesture;
identify one or more objects in the second set of images corresponding to the part of the human body based on the registered flesh tone in the first color space and the second color space;
obtain motion vectors of the one or more objects in the second set of images by tracking the one or more objects in the second set of images; and
determine the visual gesture represented by the part of the human body oriented in the different configurations according to the identified one or more objects and the motion vectors.

37. The apparatus of claim 36, wherein the part of the human body is a hand, a face, or an entire body.

38. A non-transitory computer readable medium storing instructions for recognizing hand gestures in video imagery, wherein the hand gesture has a static element, a motion element, or a mixture of the two, the instruction when executed by one or more processors cause the one or more processors to:
pre-register a user hand, using one or multiple frames of the video;
perform an adaptive hand-detection on subsequent video frames, comprising:
applying at least one of skin color/tone analysis in color spaces and motion estimation, to segment regions or objects, especially a hand, within the video frames,
wherein said skin color/tone analysis in color spaces comprises:
using skin tone analysis in one or more color spaces, to obtain skin map(s),
merging skin maps from the one or more color spaces, and
using an adaptive threshold to segment a region or object by detecting skin pixels and grouping them together, and
wherein said motion estimation comprises:
obtaining motion vector fields between two successive frames, typically for blocks within video frames,
tracking motion vectors on subsequent frames,
applying a combination of cluster analysis of motion vectors, and tracking the evolution of motion vectors on spatial regions and their features; and
recognize a hand gesture in part by applying at least one of the following four tool groups: (i) skin color/tone analysis in one or more color spaces, (ii) motion estimation, (iii) morphological operations, and (iv) other image processing tools, on regions or objects, especially a segmented hand, to detect hands, hand contours and their features, as well as any motion of hand parts;
wherein said skin color/tone analysis in one or more color spaces comprises:
using skin tone analysis in one or more color spaces, to obtain skin map(s),
merging skin maps from the one or more color spaces, and
using an adaptive threshold to segment a region or object by detecting skin pixels and grouping them together,
wherein said motion estimation comprises:
obtaining motion vectors between two successive frames, typically for blocks within video frames,
tracking motion vectors on subsequent frames, and
applying any combination of cluster analysis of motion vectors, and tracking the evolution of motion vectors, defined spatial regions and their features, to detect regions or objects within video frames,
wherein said morphological operations include dilations, erosions, opening, and closing operations, and
wherein said other image processing tools include measuring distances, angles, extrema points, convexity, and shape on hand contours.

39. The non-transitory computer readable medium of claim 38, wherein the analysis of the evolution of tracked motion vectors includes calculating the spatial position of an object from following the time history of motion vectors, in two or three-dimensional space.

40. The non-transitory computer readable medium of claim 38, wherein the adaptive hand-detection processes include at least one of the subprocesses: position, motion, and shape based processing.

41. The non-transitory computer readable medium of claim 38, wherein the hand gesture recognition processes include a position-based gesture recognition process, wherein the position-based gesture recognition process includes analysis of the evolution of tracked motion vectors up to a given video frame.

42. The non-transitory computer readable medium of claim 38, wherein the hand gesture recognition processes include a motion-based gesture recognition process, wherein the motion-based gesture recognition process includes analysis of the evolution of motion vectors over multiple frames.

43. The non-transitory computer readable medium of claim 38, wherein the hand gesture recognition processes include a shape-based gesture recognition process, wherein the shape-based gesture recognition process includes any combination of skin tone analysis in color spaces, morphological operations, and applying other image processing tools over the plurality of pixels.

44. The non-transitory computer readable medium of claim 38, wherein the hand gesture recognition processes include at least two of the subprocesses: position, motion, and shape based processing.

45. An apparatus for recognizing hand gestures in video imagery, wherein the hand gesture has a static element, a motion element, or a mixture of the two, the apparatus comprising:
a computer processor for performing steps comprising:
pre-registering a user hand, using one or multiple frames of the video;
performing an adaptive hand-detection on subsequent video frames, performing an adaptive hand-detection comprising:
applying at least one of skin color/tone analysis in color spaces and motion estimation, to segment regions or objects, especially a hand, within the video frames,
wherein said skin color/tone analysis in color spaces comprises:
using skin tone analysis in one or more color spaces, to obtain skin map(s), merging skin maps from the one or more color spaces, and using an adaptive threshold to segment a region or object by detecting skin pixels and grouping them together, and wherein said motion estimation comprises:

obtaining motion vector fields between two successive frames, typically for blocks within video frames, tracking motion vectors on subsequent frames, applying a combination of cluster analysis of motion vectors, and tracking the evolution of motion vectors on spatial regions and their features; and recognizing a hand gesture in part by applying at least one of the following four tool groups: (i) skin color/tone analysis in one or more color spaces, (ii) motion estimation, (iii) morphological operations, and (iv) other image processing tools, on regions or objects, especially a segmented hand, to detect hands, hand contours and their features, as well as any motion of hand parts;

wherein said skin color/tone analysis in one or more color spaces comprises:

using skin tone analysis in one or more color spaces, to obtain skin map(s), merging skin maps from the one or more color spaces, and using an adaptive threshold to segment a region or object by detecting skin pixels and grouping them together, wherein said motion estimation comprises:

obtaining motion vectors between two successive frames, typically for blocks within video frames, tracking motion vectors on subsequent frames, and applying any combination of cluster analysis of motion vectors, and tracking the evolution of motion vectors, defined spatial regions and their features, to detect regions or objects within video frames, wherein said morphological operations include dilations, erosions, opening, and closing operations, and wherein said other image processing tools include measuring distances, angles, extrema points, convexity, and shape on hand contours.

46. The apparatus of claim 45, wherein the analysis of the evolution of tracked motion vectors includes calculating the spatial position of an object from following the time history of motion vectors, in two or three-dimensional space.

47. The apparatus of claim 45, wherein the adaptive hand-detection processes include at least one of the subprocesses: position, motion, and shape based processing.

48. The apparatus of claim 45, wherein the hand gesture recognition processes include a position-based gesture recognition process, wherein the position-based gesture recognition process includes analysis of the evolution of tracked motion vectors up to a given video frame.

49. The apparatus of claim 45, wherein the hand gesture recognition processes include a motion-based gesture recognition process, wherein the motion-based gesture recognition process includes analysis of the evolution of motion vectors over multiple frames.

50. The apparatus of claim 45, wherein the hand gesture recognition processes include a shape-based gesture recognition process, wherein the shape-based gesture recognition process includes any combination of skin tone analysis in color spaces, morphological operations, and applying other image processing tools over the plurality of pixels.

51. The apparatus of claim 45, wherein the hand gesture recognition processes include at least two of the subprocesses: position, motion, and shape based processing.

* * * * *